(12) United States Patent
  Matz

(10) Patent No.: US 11,434,055 B2
(45) Date of Patent: Sep. 6, 2022

(54) FASTENING SYSTEM

(71) Applicant: HELLERMANNTYTON GmbH, Tornesch (DE)

(72) Inventor: Ole Matz, Hüsby (DE)

(73) Assignee: HellermannTyton GMBH, Tornesch (DE)

( * ) Notice: Subject to any disclaimer, the term of this patent is extended or adjusted under 35 U.S.C. 154(b) by 436 days.

(21) Appl. No.: 16/302,137

(22) PCT Filed: May 22, 2017

(86) PCT No.: PCT/EP2017/062300
§ 371 (c)(1),
(2) Date: Mar. 4, 2020

(87) PCT Pub. No.: WO2017/202784
PCT Pub. Date: Nov. 30, 2017

(65) Prior Publication Data
US 2020/0223606 A1    Jul. 16, 2020

(30) Foreign Application Priority Data

May 23, 2016 (DE) .................. 202016102746.2

(51) Int. Cl.
  *B65D 63/10*     (2006.01)
  *H02G 3/32*      (2006.01)
  (Continued)

(52) U.S. Cl.
  CPC ..... *B65D 63/1072* (2013.01); *B65D 63/1027* (2013.01); *F16B 2/08* (2013.01);
  (Continued)

(58) Field of Classification Search
  CPC .......... B65D 2563/108; B65D 63/1027; B65D 63/1072; F16B 21/065; F16B 21/086; F16B 2/08; H02G 3/0456; H02G 3/32
  See application file for complete search history.

(56) References Cited

U.S. PATENT DOCUMENTS 3,532,212 A    10/1970  Gatton et al.
3,552,696 A    1/1971   Orenick et al.
              (Continued)

FOREIGN PATENT DOCUMENTS

CN    104736450      6/2015
DE    9401448 U1     6/1994
              (Continued)

OTHER PUBLICATIONS

"Foreign Office Action", CN Application No. 201770031623.7, dated Mar. 3, 2021, 14 pages.
(Continued)

*Primary Examiner* — David M Upchurch
(74) *Attorney, Agent, or Firm* — Colby Nipper PLLC

(57) ABSTRACT

A fastening system having a cable tie which has i) a toothed cable tie strip and ii) a cable tie head with a detent device for detent engagement with the toothed cable tie strip. The fastening system further includes a holding apparatus which is separate from the cable tie. The cable tie, in the fully assembled state, is positioned relative to the holding apparatus such that the material for binding held by the cable tie is arranged spaced apart from the holding apparatus in order to reduce abrasion of the material for binding. A cable tie, a holding apparatus for a fastening system of the type, and a corresponding assembly method are also presented.

16 Claims, 13 Drawing Sheets

(51) Int. Cl.
  *F16B 2/08* (2006.01)
  *F16B 21/06* (2006.01)
  *F16B 21/08* (2006.01)
  *H02G 3/04* (2006.01)

(52) U.S. Cl.
  CPC .......... *F16B 21/065* (2013.01); *F16B 21/086* (2013.01); *H02G 3/0456* (2013.01); *H02G 3/32* (2013.01); *B65D 2563/108* (2013.01)

(56) References Cited

U.S. PATENT DOCUMENTS

| | | | |
|---|---|---|---|
| 3,654,669 A * | 4/1972 | Fulton | B65D 63/14 24/16 PB |
| 3,672,615 A | 6/1972 | Fiorentino | |
| 3,758,060 A | 9/1973 | Schulplin | |
| 3,913,867 A | 10/1975 | McSherry | |
| 3,924,299 A * | 12/1975 | McCormick | B65D 63/1081 24/16 PB |
| 4,347,932 A | 9/1982 | Furutu | |
| 4,456,123 A | 6/1984 | Russell | |
| 4,456,161 A | 6/1984 | Russell | |
| 4,919,373 A * | 4/1990 | Caveney | F16B 2/08 24/16 PB |
| D309,097 S | 7/1990 | Price | |
| 5,463,799 A | 11/1995 | Graham et al. | |
| 5,794,461 A | 8/1998 | Smith | |
| 5,820,083 A | 10/1998 | Geiger | |
| 6,101,690 A | 8/2000 | Giampavolo et al. | |
| 6,220,434 B1 | 4/2001 | Kubota et al. | |
| 6,256,845 B1 | 7/2001 | Tseng | |
| D464,563 S | 10/2002 | Beschenes | |
| D741,691 S * | 10/2015 | Adams | D8/356 |
| 9,387,611 B2 | 7/2016 | Dyer et al. | |
| 9,644,821 B2 | 5/2017 | Zhang | |
| 10,405,612 B1 | 9/2019 | Chan | |
| 10,510,273 B2 | 12/2019 | Burout et al. | |
| 2002/0109050 A1 | 8/2002 | Winton, III | |
| 2004/0076465 A1 * | 4/2004 | Geiger | F16B 5/0685 403/278 |
| 2006/0239796 A1 | 10/2006 | Franks | |
| 2007/0023586 A1 * | 2/2007 | Geiger | F16L 3/2334 248/71 |
| 2007/0057124 A1 * | 3/2007 | Kwilosz | F16L 3/137 248/74.1 |
| 2007/0266531 A1 | 11/2007 | Krisel | |
| 2008/0083094 A1 | 4/2008 | Hsu et al. | |
| 2008/0244874 A1 | 10/2008 | Chiorboli | |
| 2008/0250609 A1 * | 10/2008 | Franks | H02G 3/30 24/16 R |
| 2009/0113675 A1 | 5/2009 | Saltenberger | |
| 2010/0071169 A1 | 3/2010 | Williams et al. | |
| 2010/0236030 A1 | 9/2010 | Dyer | |
| 2010/0306967 A1 | 12/2010 | Geiger | |
| 2011/0162171 A1 * | 7/2011 | Gmeilbauer | F16B 2/08 24/16 R |
| 2012/0279100 A1 | 11/2012 | Burout et al. | |
| 2013/0104347 A1 | 5/2013 | Demik et al. | |
| 2013/0119208 A1 * | 5/2013 | Geiger | F16B 21/088 248/68.1 |
| 2013/0291358 A1 | 11/2013 | Hebda et al. | |
| 2014/0304951 A1 | 10/2014 | Dodd | |
| 2015/0165986 A1 | 6/2015 | Morris et al. | |
| 2015/0226354 A1 * | 8/2015 | Reed | F16L 3/1091 248/67.5 |
| 2016/0001944 A1 | 1/2016 | Aoyama | |
| 2016/0355310 A1 | 12/2016 | Rogers | |
| 2016/0358518 A1 | 12/2016 | Burout et al. | |
| 2017/0057714 A1 * | 3/2017 | Kamiya | B65D 63/1063 |
| 2017/0088322 A1 | 3/2017 | Reinke | |
| 2017/0159849 A1 * | 6/2017 | Beyer | F16L 3/233 |
| 2017/0166370 A1 | 6/2017 | Schuttler et al. | |
| 2017/0210528 A1 | 7/2017 | Burout et al. | |
| 2018/0111645 A1 | 4/2018 | Arima et al. | |
| 2018/0111729 A1 | 4/2018 | Koike | |
| 2018/0111731 A1 | 4/2018 | Sylvester | |
| 2018/0172182 A1 | 6/2018 | Matz | |
| 2018/0244447 A1 | 8/2018 | Chmelar et al. | |
| 2019/0009959 A1 | 1/2019 | Dinh et al. | |
| 2019/0119018 A1 | 4/2019 | Chmelar | |
| 2019/0218006 A1 | 7/2019 | Matz | |

FOREIGN PATENT DOCUMENTS

| | | |
|---|---|---|
| DE | 20102935 U1 | 2/2002 |
| DE | 102008020894 A1 | 12/2009 |
| DE | 202012006840 U1 | 9/2013 |
| DE | 102013219348 A1 | 3/2015 |
| EP | 1772935 A2 | 4/2007 |
| EP | 1887232 A2 | 2/2008 |
| EP | 2541113 A1 | 1/2013 |
| EP | 2816691 A1 | 12/2014 |
| EP | 2754214 B1 | 7/2015 |
| FR | 3017911 | 9/2016 |
| JP | S6043706 U | 3/1985 |
| JP | H06346907 A | 12/1994 |
| JP | H0735269 A | 2/1995 |
| JP | H08253259 | 10/1996 |
| JP | 2000308241 | 11/2000 |
| WO | 2016020027 A1 | 2/2016 |
| WO | 2016196866 | 12/2016 |

OTHER PUBLICATIONS

"Foreign Office Action", JP Application No. 2018-561482, dated Apr. 26, 2021, 12 pages.
"Foreign Office Action", JP Application No. 2018-561716, dated Jun. 30, 2021, 33 pages.
"Foreign Office Action", KR Application No. 10-2018-7037014, dated Jul. 23, 2021, 4 pages.
"Foreign Office Action", JP Application No. 2018-561482, dated Aug. 27, 2021, 6 pages.
"Foreign Office Action", CN Application No., dated Dec. 10, 2019, 19 pages.
"Foreign Office Action", CN Application No. 201780031652.3, dated Dec. 11, 2019, 18 pages.
"Non-Final Office Action", U.S. Appl. No. 16/303,382, filed Jun. 24, 2020, 7 pages.
"Restriction Requirement", U.S. Appl. No. 16/303,382, filed Apr. 30, 2020, 6 pages.
Pursuant to MPEP § 2001.6(b) the applicant brings the following application to the Examiner's attention: co-pending U.S. Appl. No. 16/303,382.
"Foreign Office Action", CN Application No. 201780031623.7, dated Aug. 27, 2020, 20 pages.
"Notice of Allowance", U.S. Appl. No. 16/303,382, filed Sep. 11, 2020, 8 Pages.

* cited by examiner

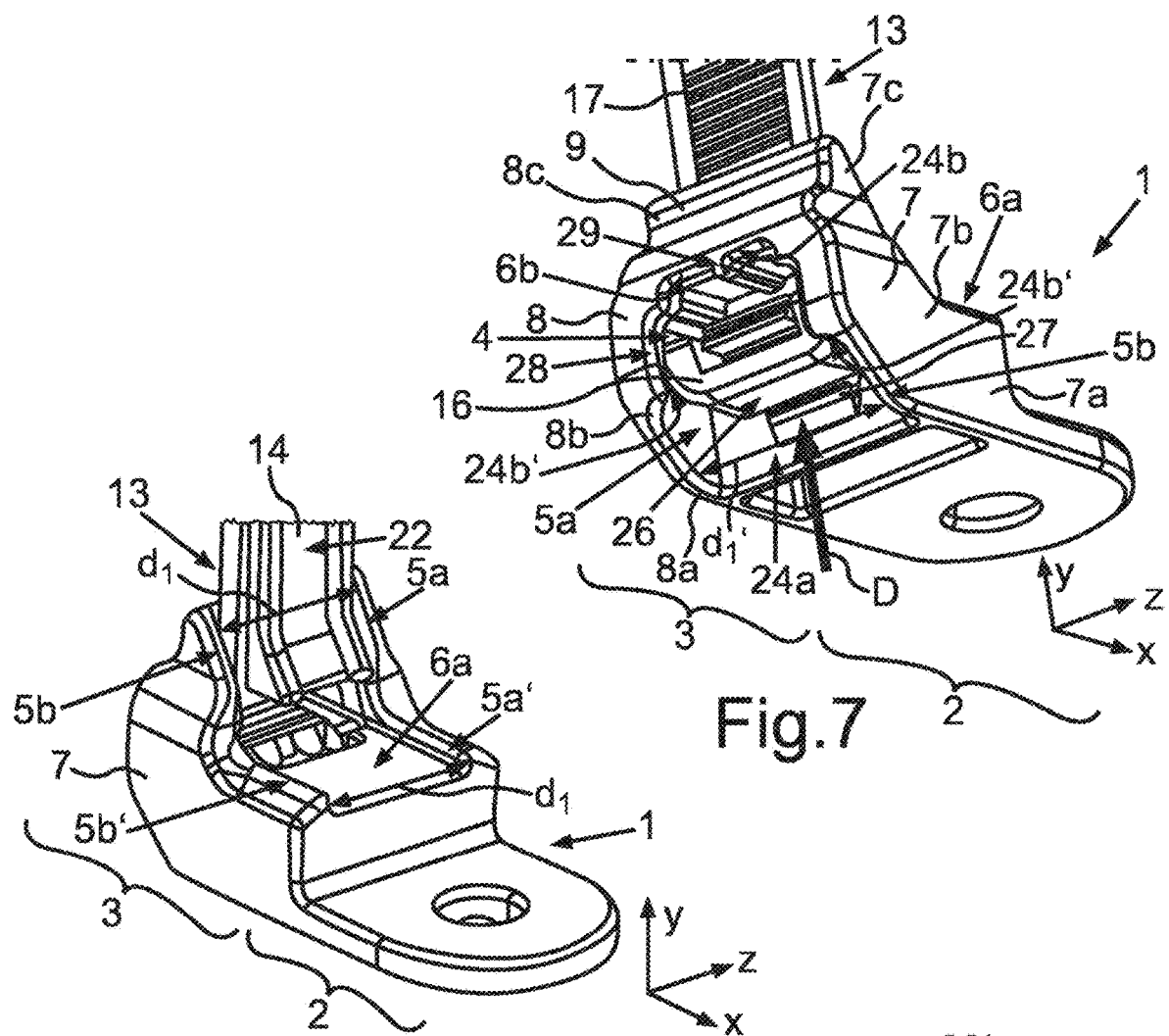
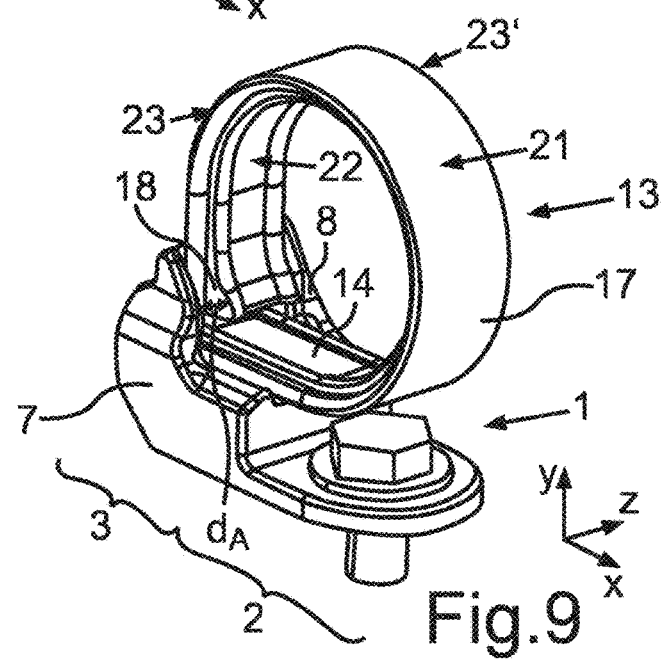

FASTENING SYSTEM

CROSS-REFERENCE TO RELATED APPLICATIONS

This application is a national stage application under 35 U.S.C. § 371 of PCT Application Number PCT/EP2017/062300 having an international filing date of May 22, 2017, which designated the United States and claimed priority under Article 8 of the Patent Cooperation Treaty to Application 202016102746.2 filed in the German Patent Office om May 23, 2017, the entire disclosure of each of which is hereby incorporated herein by reference.

TECHNICAL FIELD OF THE INVENTION

The invention relates to a holding apparatus for a cable tie, and to a cable tie and a fastening system.

BACKGROUND OF THE INVENTION

For the bundling or fastening of material for binding on or to a further component, a multiplicity of cable ties and corresponding means of fastening cable ties to such a further component are known.

Here, a cable tie is to be understood to mean a holding means which can be inserted into itself to form a closed loop and which is deformable in a defined and reversible manner. The loop is thus formed by virtue of the cable tie being inserted into itself. In the fully assembled state of the cable tie, the material for binding extends through the loop. A cable tie in this case normally has a cable tie head on which there is arranged an elongate cable tie strip. The cable tie head and cable tie strip may be formed in one piece, for example from plastic. Here, the cable tie strip is equipped with a toothing and can be inserted through a passage region through the cable tie head in order to form the loop. Here, the cable tie head has a detent device for detent engagement with the toothed cable tie strip. Here, the detent device may be designed to be releasable by means of a suitable tool, such as for example a screwdriver or a needle.

For better comprehensibility, certain expressions that are essential to the understanding of the invention will be defined below. An outer side of the cable tie is that side of cable tie head and cable tie strip which, in a fully assembled state around is oriented opposite the material for binding. The outer side is thus uniquely defined even in an unassembled state of the cable tie. An inner side of the cable tie is that side of cable tie head and cable tie strip which, in the fully assembled state around a material for binding, is oriented toward the material for binding. Respective edge surfaces are situated at the edges of the cable tie strip between inner and outer sides or the surfaces between inner and outer sides of the cable tie head. That side of the cable tie head which is averted from the cable tie strip is the rear side of the cable tie head, and that side of the cable tie head which faces toward the cable tie strip, and on which the cable tie strip is arranged, is the front side of the cable tie head. A cable tie may in this case alternatively be toothed both on the inner side and on the outer side of the cable tie strip. This is then correspondingly referred to as an externally toothed or internally toothed cable tie.

For example, DE 202012006840 U1 discloses a cable tie of the type from the company HellermannTyton with a cable tie head and with a cable tie strip extending away from the cable tie head, wherein the material-for-binding abutment surface of the cable tie strip has, in the situation shown, an anti-slip structure. U.S. Pat. No. 9,387,611 B2 discloses a cable tie with a damper.

Normally, the material for binding, which may comprise a single cable, a single pipe and also a bundle of pipes or cables, is bound into the loop of the cable tie by means of a holding element in order to connect the holding element to the material for binding. The holding element may then, designed for example as a fastening plinth, be screwed, adhesively bonded or fastened in some other way to a further component. Such a holding element is disclosed for example in WO 2016/020027 A1. U.S. Pat. No. 5,820,083 A also discloses holding apparatuses which are bound together with the material for binding into the loop of the cable tie.

Furthermore, clamps, so-called P-clamps, which are also fastenable to other components, are known for example from EP 2541113 A1 and EP 2816691 A1, which clamps can be tightened using a cable tie in order to fasten material for binding in bundle form in different predetermined diameters to the further component. Since these clamps can, owing to their stiffness, be utilized for the material for binding only in a narrow range of diameters, use is typically made here of a series of different embodiments with different diameters.

It is now the object to provide an improved holding apparatus for a material for binding, which holding apparatus is suitable in particular for material for binding with different diameters and, in an inexpensive manner, also holds a material for binding at an elevated temperature for example over 100° C., preferably over 150° C., gently and reliably exactly in a predetermined position relative to a further component.

SUMMARY OF THE INVENTION

The invention relates firstly to a holding apparatus for a cable tie which has a toothed cable tie strip and has a cable tie head with a detent device for detent engagement with the toothed cable tie strip. The cable tie may be manufactured from plastic. Here, the holding apparatus may be composed of plastic and may in particular be produced in one piece from plastic. Here, the holding apparatus has a fastening foot for the fastening of the holding apparatus to an external component, and a fastening head which is arranged on the fastening foot. The fastening head or the fastening foot may also be composed of plastic. In particular, the fastening foot may be composed of a plastic and of a metal component encapsulated with the plastic.

Here, the fastening head has a passage region for the pushing or inserting of the cable tie strip through the holding apparatus and for the holding of the cable tie on the holding apparatus. It is essential here that the passage region has, for the receiving of the cable tie with an accurate contour, at least two differently oriented guide slots with in each case a pair of oppositely oriented, in particular oppositely situated, support surfaces. The passage region thus serves, with its guide slots, for the defined guiding of the cable tie through the passage region during the assembly of the cable tie on the holding apparatus. In the fully assembled state, the passage region then serves for the holding of the cable tie.

The orientations of the support surfaces of the respective guide slots are determined here from their respective normal vectors, which in the case of oppositely oriented support surfaces are oriented oppositely, that is to say point in opposite directions. The expression "substantially" may be understood to encompass a deviation of the respective directions by less than 30 degrees, less than 15 degrees, less than 10 degrees, less than 5 degrees or preferably even less than 2 degrees. The orientation of the guide slot is determined here from the situation of the two support surfaces. Accordingly, the orientation of a guide slot can be defined by the subtraction of the normal vectors of the two support surfaces of the guide slot, for example through a plane perpendicular to the vector. Then, in the case of parallel support surfaces, this plane also runs parallel to the support surfaces of the respective guide slot. Here, the orientation may furthermore be defined by a main direction of extent of the associated support surfaces perpendicular to the normal vectors. Altogether, the orientation may thus be predefined by the direction in which, during intended use, the cable tie is pushed or pulled through the guide slot.

The support surfaces may be oppositely situated support surfaces. Two surfaces are situated oppositely if a respective normal vector of one surface runs through the other surface. The support surfaces may alternatively also be support surfaces which are offset with respect to one another. Two surfaces are offset with respect to one another if no normal vector of one surface runs through the other surface, but rather all normal vectors of one surface run only through an elongation of the other surface in the plane of the other surface. In particular, support surfaces offset with respect to one another may be arranged such that the point at which the normal vector of one support surface intersects the plane of the other support surface meets the plane of the other support surface at a distance which is no further remote from the other support surface as the other support surface is large in the direction. The "gap" between the support surfaces is in this case thus no greater than the extent of the support surfaces in the direction.

Here, the support surfaces are designed for the guiding of associated surface regions of the cable tie head and/or of the cable tie strip. Here, the surface regions of the cable tie head and/or of the cable tie strip are preferably situated in each case opposite one another. Thus, when a cable tie has been fully assembled on the holding apparatus, the cable tie head and/or the cable tie strip is arranged in each case at least partially between the respective pairs of support surfaces of the respective guide slot. The support surfaces are thus designed for abutment against the associated surface regions of the cable tie head and/or of the cable tie strip, in particular for positively locking abutment against the associated surface regions of the cable tie head and/or of the cable tie strip. Thus, after the final assembly process, regions of the cable tie are arranged in each case between oppositely situated support surfaces.

Here, the first guide slot with the first pair of support surfaces is designed for abutment against surface regions at edge sides of the cable tie head and/or of the cable tie strip. A spacing of the support surfaces can thus be adapted to a width of the cable tie head and/or of the cable tie strip in a transverse direction of the cable tie from edge side to edge side. This has the effect that, after a final assembly process, the support surfaces of the first guide slot a movement of the cable tie relative to the holding apparatus in the transverse direction, in which the edge sides of the cable tie head and/or of the cable tie strip are oriented in each case, is prevented. This transverse direction runs perpendicular to the longitudinal direction of the cable tie, which constitutes the main direction of extent thereof.

Furthermore, the support surfaces of the second guide slot, by abutment against respective surface regions of a respective outer and/or inner side of the cable tie head and/or of the cable tie strip, also prevent a movement in a second direction that differs from the transverse direction of the cable tie. The second direction in this case preferably runs substantially perpendicular to the transverse direction. Thus, by means of the first guide slot, the cable tie is guided so as to be movable in the longitudinal direction and is held in the transverse direction.

The holding apparatus thus has a cage geometry into which the cable tie is inserted and—possibly also the material for binding—is pre-fixed. The holding apparatus is characterized in that the cable tie is touched or contacted by the holding apparatus only laterally, at the edge sides, and an outer side, preferably two outer surfaces of the wall geometry, close to the head, of the cable tie and at most at two marginal regions of the inner surface of the cable tie strip. The two marginal regions are in this case separated by a central region. In the fully assembled state of the cable tie, the marginal regions may have approached the cable tie head and be correspondingly adjacent thereto.

The closure, or insertion of the cable tie through itself, that is to say of the cable tie strip through the cable tie head, leads to the final fastening or final fixing of the material for binding. By means of the contact of the cable tie with the holding apparatus, which contact is restricted to the edge sides of the cable tie and the outer surfaces of the cable tie, or at most the marginal regions of the inner surface of the cable tie, the holding apparatus remains at a distance from the material for binding, that is to say (at least with the selection of a suitable cable tie described below), remains spaced apart from the material for binding. Thus, the holding apparatus cannot mechanically damage the material for binding. At the same time, conversely, it is also not possible for elevated temperatures of the material for binding to be transmitted directly to the holding apparatus, giving rise to an advantage with regard to possible materials of the holding apparatus. Thus, it is also possible for the production costs to be reduced, because only the cable tie must withstand the elevated temperatures without sustaining damage, whereas the holding apparatus is exposed to only relatively low temperatures owing to the spacing.

Through the use of the cable tie technology, the shortening of the cable tie strip using a tool to the existing diameter of the material for binding, the number of components required for different materials for binding is reduced in relation to the conventional use of clamps. Thus, using one or two cable ties or cable tie types with different lengths, it is possible for material for binding with a multiplicity of different diameters to be fastened. For example, it is thus possible for material for binding with a diameter in the range from 5 to 50 millimeters to be fastened. The flexibility of the holding arrangement is thus very great. It is thus also possible, through the use of the holding apparatus, to realize an expandable component family with relatively low costs.

Here, the first guide slot may be realized in different variants. Accordingly, the first guide slot may for example have a first support surface for abutment against a first surface region of a first edge side of the cable tie strip and a second support surface for abutment against a second surface region of the opposite edge side of the cable tie strip. The first guide slot may also have a first support surface for abutment against a first surface region of an edge side of the cable tie head and a second support surface for abutment against a second surface region of the second edge side of the cable tie head.

The first guide slot may also have divided support surfaces, which in each case support the edge sides of the cable tie strip and/or of the cable tie head at different, mutually spaced-apart regions (that is to say regions separated by a non-zero spacing) of the cable tie. The divided support surfaces thus have partial support surfaces which at least regionally, that is to say regionally or entirely, run parallel to one another and support the cable tie in the different regions. For example, it is thus possible during intended use for an end region, close to the head, of the cable tie strip to be supported at its edge sides by a partial support surface pair of the first guide slot and/or for a second region of the cable tie strip, which is inserted through the cable tie head and which in the fully assembled region adjoins the cable tie head (or approaches the latter), to be supported at its edge sides by a further partial support surface pair of the first guide slot. Thus, a spacing between the holding apparatus and the material for binding can be further enlarged, and furthermore material can be saved in the holding apparatus.

Here, it is in particular also possible for a pair of partial support surfaces to be arranged on the fastening foot, in particular on a movable clamping element. The clamping element is then firstly held particularly exactly in an intended position by the cable tie, and secondly, in turn, it is also the case that the cable tie is guided more exactly and the overall stability is improved.

In one advantageous embodiment, provision is made for the guide slots to open into one another. Thus, the cable tie strip and/or the cable tie head, as it is inserted into one guide slot, in particular into the second guide slot, can be guided in targeted fashion toward the other guide slot, in particular toward the first guide slot.

Thus, a second cable tie section, that is to say for example the cable tie head and/or the cable tie strip or at least a respective part of cable tie head or the cable tie strip, as it is inserted into one, for example the second, guide slot after a first cable tie section has been inserted into the other, for example the first, guide slot, can be guided in targeted fashion toward the first guide slot. This may also apply conversely. This then applies at least to two of the guide slots, but in particular correspondingly for three or all of the guide slots in the case of a greater number of guide slots. It is particularly advantageous if the first and second and/or the first and a third guide slot, specified further below, open into one another. Here, the second guide slot may open into a first pair of support surfaces of the first guide slot, and the third guide slot may open into a second pair of support surfaces of the first guide slot. In particular, the second cable tie section, then belonging to the cable tie strip, and a first cable tie section, for example the cable tie head, inserted into the first guide slot, can be guided into one another, in particular guided into one another with detent action, in targeted fashion.

The guide slots which open into one another thus enable the cable tie to be held in a particularly exact and stable manner on the holding apparatus. Furthermore, operability is improved, such that for example a process of threading into the guide slots is made easier. For this purpose, the respective support surfaces, in particular the oppositely situated support surfaces, of the guide slots may also, in each case for a guide slot, that is to say for example the first and/or second and/or third guide slot, converge conically on one another at least regionally, that is to say regionally or entirely.

In a further advantageous embodiment, provision is made for the guide slots to be arranged in each case at an angle of between 75 and 105 degrees, in particular between 85 and 95 degrees, with respect to one another. This applies to at least two of the guide slots, in particular to two pairs of guide slots or all guide slots. The orientation of the guide slots, on the basis of which a respective arrangement is defined, may in this case be defined for example by the orientation of the support surfaces, that is to say in particular a mean orientation of the support surfaces. For the determination of the mean orientation, it is for example possible for the respective normal vectors of the support surface pairs to be subtracted from one another, and for the orientation of the respective resultant vector of different guide slots to be compared. The stated arrangement has the advantage that, by means of the guide slots, particularly stable hold of the cable tie in three-dimensional space is achieved, because the degrees of freedom of the cable tie are thus limited in a physically optimized manner by the guide slots.

In a further advantageous embodiment, provision is made for the fastening head to have, in the passage region, at least two arms which have a respective foot region associated with the fastening foot and a respective end region averted from the fastening foot, and a respective central region situated between foot region and end region. The central region has in each case an internally situated support surface, specifically on the inner side of the respective arm facing toward the other arm in each case. Here, the internally situated support surfaces are part of the first guide slot with the first pair of support surfaces. The arms are thus in particular designed to support the cable tie strip, in a region of the edge sides of the cable tie strip, in regions with the respective internally situated support surface, and to prevent a transverse movement of the cable tie strip. Here, in the fully assembled state, the internally situated support surfaces of the first guide slot are preferably each arranged at least regionally, that is to say regionally or entirely, on the cable tie strip. This has the advantage that the internally situated support surfaces already effect lateral guidance of the cable tie independently of the fully assembled state being attained. This contrasts with the prior art, in the case of which such lateral guidance is not known, but rather lateral slippage by means of a friction force on the inner surface of the cable tie and on a web, bound with the material for binding, of a holding arrangement is realized for the first time with the tightening of the cable tie and the detent engagement under tensile force for the first time in the fully assembled state. Thus, increased exactness of the guidance is achieved by means of the invention.

In the second guide surfaces of the second guide slot, in each case in the end regions of the arms, there may be provided a protruding lug which is provided for engagement into a corresponding depression described further below. Improved guidance and more stable hold of the cable tie is thus realized.

In a further embodiment, provision may be made, as described above, for the second support surfaces of the second guide slot to be oriented oppositely, with a deviation, relative to the first support surface of the second guide slot, that is to say to be designed so as to be inclined relative to one another. Here, the deviation may amount to between 0 degrees and 30 degrees. The deviation preferably amounts to 15 degrees, that is to say the second support surfaces are inclined relative to the first support surface preferably by 15 degrees. The corresponding angle may in this case be measured in a plane perpendicular to the pushing-through direction, that is to say, during the intended use of the holding apparatus with a cable tie, in a plane perpendicular to the longitudinal direction of the cable tie. It is to be noted here that the pushing-through direction may be a locally varying pushing-through direction, because, for example owing to the curvature, described in more detail below, of the first support surface of the second guide slot, the cable tie is also curved as it is pushed through, and thus the pushing-through direction is changed. This reduces a bending load in the holding apparatus, and moreover permits a greater spacing between holding apparatus and material for binding.

In a further embodiment, provision is made for the second guide slot to have a first support surface in the foot region of the respective arm and to have a further support surface in the end region of the respective arm, which support surfaces form a second pair, in particular the second pair, of opposite support surfaces of the second guide slot. The first support surface is thus part of a or the second pair of opposite support surfaces of the second guide slot and is designed in particular for abutment against an outer side of the cable tie, in particular of a cable tie strip. The further support surface is likewise part of the second pair of opposite support surfaces and is provided in particular for abutment against an inner side of the cable tie, in particular of the cable tie strip. In particular, the further support surface is in this case designed for, in particular positively locking, abutment against one of two marginal regions of the inner side of the cable tie or cable tie strip. The marginal regions may in this case adjoin the respective edge sides of the cable tie. Here, one marginal region is separated from the marginal region associated with the other edge side by a central region, which does not come into abutment with the first or further support surface of the second pair of the second guide slot. The further support surfaces associated with the second guide slot may be designed in particular as end surfaces on the respective end region of the arms, in order, in the fully assembled state, to be arranged in abutment, in each case at an inner side of the cable tie strip, with in each case one of the marginal regions of the cable tie strip. Here, the first support surface which is opposite, in particular situated opposite, the end surfaces may be designed to be arranged in abutment at least regionally, that is to say regionally or entirely, with the outer side of the cable tie strip. This has the advantage that a cable tie can, by means of the holding apparatus, be fixed precisely and flexibly in accurately fitting fashion both in a transverse direction and in a vertical direction. Here, the holding arrangement is independent of the length of the cable; the cable tie can be adjusted as desired in the pushing-through direction of the cable tie through the passage opening, which facilitates the final assembly process.

Here, the support surfaces of the first and second guide slots may, in a cross section perpendicular to the pushing-through direction, assume the shape of two oppositely situated "U"s pointing with their limbs toward one another. The support surfaces of the first guide slot may in this case be arranged in each case on the U base limb. The support surfaces of the second guide slot may be arranged on the inner sides of the U side limbs. The U side limbs, facing toward the fastening foot, may also transition into one another. In the latter case, a C-shaped overall slot is realized in the cross section perpendicular to the pushing-through direction through the two guide slots. This has the advantage that, during the pushing-through and in the fully assembled state, the cable tie is engaged around in regions by the U limbs, and is guided and held particularly exactly and reliably.

"C-shaped" may be understood in particular to mean a geometry which, in a cross section perpendicular to the pushing-through direction, has an interruption in encircling fashion around the pushing-through region in which, during intended use with a cable tie, the cable tie is pushed in. "C-shaped" may preferably be understood to mean a geometry with a contour without corners. The spatial orientation of the "C" is in this case not of significance. During intended use with a cable tie, it is the case here that the end sections of the "C" come into abutment in each case with an inner marginal region of the cable tie strip. The marginal regions of the cable tie strip are thus separated from one another by a central region of the cable tie strip, which does not come into abutment with the holding apparatus. A central region of the "C", situated between the end sections along the arc of the "C", then comes into abutment with an outer side of the cable tie strip, and respective intermediate regions of the "C" between the central region and the end sections come into contact with respective edge sides of the cable tie strip. Altogether, it can thus be achieved that, during the intended use of the holding apparatus with cable tie and material for binding, the cable tie strip touches the material for binding (in particular only) in the central region, and, at the same time, at the outer side and edge sides and in the marginal regions, comes into abutment with the corresponding support surfaces of the holding apparatus and is held by the holding apparatus. This is preferably realized without the holding apparatus touching the material for binding.

In one advantageous embodiment, provision is made here for the first support surface of the second guide slot to be arched in the pushing-through direction. The cable tie strip is thus curved toward its inner side as it is pushed through, such that, in regions, bending of the cable tie strip around the material for binding is pre-empted. The arching may have a predefined radius which lies in a plane with the normal vectors of the first support surface. In particular, the first support surface may have a curved central region which is adjoined in the positive and negative pushing-through directions in each case by a non-curved end region of the support surface. The cable tie strip is in this case, during the pushing-through, thus pushed firstly along one non-curved end region, then along the curved central region and finally along the further non-curved end region. The two end regions may in this case be at an angle of between 105 degrees and 165 degrees with respect to one another, preferably at an angle of between 115 degrees and 140 degrees with respect to one another. Thus, the assembly of the cable tie on the holding apparatus, and the subsequent fastening of the material for binding, are facilitated.

Here, the first support surface may be arranged offset with respect to the further support surfaces; for example, apertures may be provided in respective spatial regions, situated opposite the further support surfaces, of the first support surface. This yields advantages in terms of production because, in this way, no undercuts are required.

The first support surface may have a greater extent in the foot region of the arms in the pushing-through direction than the further support surface or the further support surfaces. In particular, the extent of the first support surface in the pushing-through direction may be more than two times or three times as great as the extent of the further support surface(s) in the pushing-through direction. This results in particularly good guidance of the cable tie strip.

In a further advantageous embodiment, provision is made for the holding apparatus to have an abutment surface oriented substantially perpendicular to a pushing-through direction of the cable tie in which the cable tie can be pushed through the passage and the guide slots, which abutment surface serves for the abutment, in particular positively locking abutment, of a surface region against the front side, facing toward the cable tie strip, of the cable tie head. The abutment surface may be arranged in the form of a displacement ramp oblique with respect to the pushing-through direction in order, in the presence of tension and movement of the cable tie in the pushing-through direction, to push the cable tie against one of the support surfaces of one of the guide slots, in particular of the second guide slot. Again, the advantage of simple and exact assembly is realized, because in this way, the accuracy of the guidance is increased, and at the same time the abutment that is formed increases the ease of assembly. A process of threading into the cable tie head, which is held at a predetermined location by the holding apparatus, is also made easier in this way.

In a further embodiment, provision is made here for the arms to be connected in their end regions by a bridge, and thus for a hole-like passage to be formed in the passage region. The passage is delimited by the bridge, the arms and the support surface, situated opposite the end surfaces, of the second guide slot. Here, in particular, a height of the passage substantially perpendicular to the pushing-through direction is smaller than and/or equal to a maximum height of the cable tie strip. The height of the cable tie strip can be determined from the spacing of outer side and inner side. This has the advantage that, specifically with an abutment surface oriented non-perpendicularly with respect to the pushing-through direction of the cable tie or of the cable tie strip, additional jamming or detent engagement of the cable tie strip in the passage region can be realized. Specifically if the height of the passage is smaller than that of a maximum height of the cable tie strip, the possibility of detent engagement is realized in an elegant manner if a cable tie is used which has a soft component and a hard component, which are described further below, for example with a soft component on an inner side of the cable tie strip. In this case, it is specifically possible for an element formed from the soft component, preferably on the inner side of the cable tie strip, to be deformed, and placed into a detent engagement position, during the pushing-through action. Thus, the cable tie can also be preassembled on the holding apparatus, as will be discussed below on the basis of an exemplary further embodiment.

In a further embodiment, it is specifically possible for a thickness of the bridge in the pushing-through direction, that is to say in the longitudinal direction of the cable guide in the fully assembled state, to correspond to a spacing between the front side, facing toward the cable tie strip, of the cable tie head, in particular the abovementioned abutment surface, or to a spacing between a guide surface, oriented away from the cable tie strip, in the cable tie head, on which guide surface the outer side of the cable tie strip is guided during the insertion of the cable tie strip through the cable tie head, on the one hand, and a detent projection of the cable tie strip on the inner side of the cable tie strip, on the other hand. The bridge may then thus be arranged, in the fully assembled state, between the detent projection and the front side of the cable tie head and/or between the detent projection and the inner side of the cable tie strip. Here, this inner side of the cable tie strip adjoins in particular a region, inserted through the cable tie head, of the cable tie strip.

The thickness of the bridge may thus be equal to the spacing or slightly greater, for example greater by less than 2, 5 or 10 percent. This has the advantage that the bridge serves as a detent apparatus for the cable tie head on the holding apparatus. If the thickness of the bridge is adapted to the spacing of the inner side of the cable tie strip and the detent projection of the cable tie strip arranged, on the inner side of the cable tie strip, on an end of the cable tie strip facing toward the cable tie head, then in the fully assembled state, in which the cable tie strip has been inserted through the cable tie head, then is finally fixed in a predefined position by the bridge of the cable tie, and is no longer displaceable without a release of the cable tie. Particularly exact hold of the material for binding with high precision is thus realized.

In another embodiment, provision is made for the passage region to have a third guide slot which is oriented or arranged differently in relation to the first and in relation to the second guide slot and which has a third pair of in each case oppositely situated support surfaces. These support surfaces are designed for abutment, in particular for positively locking abutment, against associated, in each case oppositely situated surface regions of the cable tie head and/or of the cable tie strip, such that, in the case of a cable tie fully assembled with material for binding, the cable tie head and/or the cable tie strip is arranged at least partially, that is to say partially or entirely, between the support surfaces. The surface regions of the cable tie head and/or of the cable tie strip may thus be arranged in particular on the inner and/or outer side of the cable tie head and/or of the cable tie strip. In particular, it is possible here for the support surfaces of the third pair to be oriented in a respective spatial direction which is mathematically independent of the spatial directions in which the support surfaces of the first and the second pair are oriented. This yields the advantage of maximum stability of the support of the cable tie. Furthermore, in this way, the position of the cable tie head is particularly exactly predefinable, and, as discussed in the exemplary embodiments further below, assembly is also possible from different angles. Thus, the greatest possible ease of assembly and flexibility of the holding apparatus is achieved.

Here, the passage may also be a hole-like passage. The passage may be delimited by the at least three pairs of support surfaces. One or more support surfaces of different guide slots, in particular of the first and of the second, and/or of the first and of the third, guide slots, may in this case transition into one another in corner or connection regions.

Here, the support surfaces of the first guide slot may be of L-shaped design as viewed perpendicularly with respect to the support surfaces. The support surfaces of the first guide slot may, in a respective end region of the first limb, transition in each case into a support surface of the second guide slot. Alternatively or in addition, the support surfaces may, in a respective end region of the second limb, transition in each case into a support surface of the third guide slot. These three or four support surfaces are in this case preferably arranged at least substantially perpendicular to one another. Here, the passage region may advantageously be formed in the angle of the L. In the case of a fully assembled cable tie, the cable tie is arranged with its crossing region, which is formed by the insertion of the cable tie strip through the cable tie head, between the respective angle of the two L-shaped surfaces formed by the first support surfaces. The loop of the cable tie is in this case arranged, in a side view, in the region between the limbs of the L, and the cable tie head is arranged in the region at the sharp corner of the L. Thus, by means of the holding apparatus, in two diagonally oppositely situated corners or angle regions which are generated by the lead through of the cable tie through itself in the crossing region, the cable tie is, in the case of a fastening of a material for binding at the inner side of the cable tie, clamped in the passage region to the holding apparatus. This realizes a reliable fastening of the material for binding in an exact, flexible and inexpensive.

A bridge, that is to say one or all of the bridges or webs, which in this embodiment connect in each case two opposite end regions of the two L limbs of the support surfaces of the first guide slot, may in this case, for example at an outer side of the L limb, adjoin the L limb. Here, the outer side is for example in each case that side of the L limb which is averted from the other limb of the respective L, and/or which is not oriented toward the other limb. Correspondingly, the inner side is then that side of the L which adjoins the angle formed by the two limbs of the L. Thus, the bridges with the L limbs can assume a U-shaped form in a cross section perpendicular to the respective L limb. Here, the support surfaces of the first guide slot are arranged on the inner sides, oriented toward one another or facing one another, of the U side limbs, and in each case one support surface of the second or third guide slot is arranged on the respective U base limb.

This has the advantage that, in the passage region, a cage-like guiding and holding structure is formed, in the case of which the cable tie, as it is pushed through in the pushing-through direction, is supported by the U-shaped design of the support surfaces in three directions. This is made possible by the bridges for two directions, which are defined in each case by the orientation of the L limbs. In this way, in the case of the pushing-through being performed through the passage region twice, such as is required for the hold of the cable tie, improved guidance and, in the fully assembled state, improved hold are each achieved.

In a further advantageous embodiment, provision is made for the second guide slot to be designed so as to be arranged, in the fully assembled state, with one support surface thereof in abutment, in particular in positively locking abutment, against a surface region on the outer side of the cable tie strip and with its other support surface in abutment against a surface region on a front side, facing toward the cable tie strip, of the cable tie head. In particular, the second guide slot is thus designed to prevent a movement of the cable tie in a vertical direction of the passage region, which in a physical exemplary embodiment may both correspond to a pushing-through direction of the cable tie and also be substantially perpendicular thereto.

Here, the surface region on the outer side of the cable tie in particular does not adjoin the cable tie head and/or a region of the front and/or rear side of the cable tie head. It is to be noted that the regional designations here refer to the cable tie in a non-installed state, that is to say in a state not inserted into one another. In an inserted-together state, it is thus possible for a surface region which in the non-installed state of the cable tie does not adjoin the cable tie head to move into the vicinity of the cable tie head as a result of the pushing-through action. Specifically owing to the support of the cable tie by the support surfaces of the holding apparatus in the vicinity of the detent device of the cable tie head, a high degree of precision is realized in the installation and flexibility with regard to the cable ties used. As a result of the cable tie being held in the region of the cable tie head, the cable tie head is also stabilized, which increases the reliability of the detent device.

In a further embodiment, provision is made for the third guide slot to be designed so as to be arranged, in the fully assembled state, with its first or one support surface in abutment against a surface region on the inner side of the cable tie head, and to be arranged, in the fully assembled state, with its other or further support surface in abutment against a surface region on the outer side of the cable tie head and/or on the outer side of the cable tie strip, which adjoins the cable tie head. In particular, the third guide slot is thus designed to limit a movement of the cable tie in the depth direction of the passage region or passage. The depth direction is in this case substantially perpendicular to the vertical direction of the passage region. It may correspond to the passage direction through the passage during an insertion of the cable tie strip through the cable tie head in the case of which at the same time, for example during the final assembly, comprises the cable tie strip being pushed for a second time through the passage. In this case too, the cable tie head is once again stabilized by virtue of the cable tie being held in the region of the cable tie head, which further increases the reliability of the detent device.

In another advantageous embodiment, provision is made for the opposite support surfaces of the first guide slot to converge in a wedge-shaped manner on one another at least regionally, in particular in the vertical and/or depth direction of the passage. Here, the support surfaces are designed to be arranged at least regionally in abutment, in particular in positively locking abutment, against respective associated surface regions on the edge sides of the cable tie head.

The wedge-shaped support surfaces which converge on one another offer the advantage that a tensile force built up in the cable tie for the purposes of binding the material for binding is simultaneously used for the improved abutment, in particular for the improved positively locking abutment, and thus a degree of play of the cable tie, in particular of the cable tie head in the holding apparatus, is minimized. This yields a defined, precise fixing of the cable tie on the holding apparatus, in the case of which, in particular, a degree of play of cable ties that are possibly not fully suitable can be compensated by slight deformation of the cable tie and/or of the holding apparatus.

The holding apparatus may thus be designed such that the cable tie can be pushed through the passage both in a vertical direction and in a depth direction of the passage, in particular until the cable tie head is situated at least regionally, that is to say regionally or entirely, in the end position provided for the fully assembled state. Here, the pushing-through direction is to be regarded as the direction of the second pushing-through action.

This has the advantage of realizing a particularly flexible installation facility, in the case of which the pushing-through direction of a first pushing-through action of the cable tie strip through the passage region coincides with the pushing-through direction of the second pushing-through action of the cable tie strip through the passage region, in the case of which the cable tie strip is simultaneously inserted or pushed through the cable tie head. Thus, in flat situations in which structural space is limited, and in which the holding apparatus is already mounted for example close to a large planar surface, the cable tie can be held with its head close to, for example, the surface or generally the further component, and can nevertheless be assembled there without problems.

In a further particularly advantageous embodiment, provision is made for the holding apparatus to have an additional guide element, which in particular adjoins the first guide slot and by means of which a pushing-through action of the cable tie, until the cable tie head is situated at least regionally, that is to say regionally or entirely, in the position provided for the fully assembled state, is restricted to a pushing-through action in substantially a single direction. The additional guide element may in particular be part of the third guide slot. This has the advantage that, already at an early time during the assembly process, the cable tie in the holding apparatus has only one translational degree of freedom, such that slippage and the like during the assembly process is substantially ruled out, which makes handling particularly straightforward.

In another particularly advantageous embodiment, provision may be made here for the holding apparatus to have an additional detent element, by means of which the cable tie head can, in the end position provided for the fully assembled state, be engaged with detent action in the fastening head. Here, the detent element is arranged in particular on a support surface of the second or third guide slot. This has the advantage that the cable tie can be reliably preassembled and, during assembly in the holding apparatus, can no longer inadvertently slide on the external component out of the holding apparatus. Also, it can thus be ensured that, during the detent engagement of the cable tie strip with the detent device of the cable tie head, it does not slip within the holding apparatus and thus possibly, under adverse conditions, make it more difficult or impossible for the cable tied to be tightened or pushed through.

The invention also comprises an, in particular modular, fastening system or a modular fastening apparatus having a cable tie and a holding apparatus (composed in particular of plastic), which is separate from the cable tie, for the fastening of the system to a component external to the system. The cable tie has in this case a toothed cable tie strip and a cable tie head with a detent device for the detent engagement with the toothed cable tie strip. The cable tie may in particular also be one of the cable ties described further below. In this case, particular advantages are achieved, which will be discussed further below.

It is crucial here that the cable tie, in the fully assembled state, is positioned in a holding form of the cable tie set for the holding of the material for binding such that the material for binding held by the cable tie is touched only by the cable tie. The material for binding is thus arranged so as not to be in contact with, and/or so as to be spaced apart from, the holding apparatus. Here, the cable tie may be attachable to the holding apparatus so as to be releasable in non-destructive fashion, that is to say for example releasable by means of a tool. This has the advantage that heat transfer from a material for binding which warms up, such as for example electrical cables, to the holding apparatus is minimized. Moreover, by means of the spacing, mechanical loading of the material for binding by the holding apparatus can be ruled out or reduced. Both increase the flexibility in the material selection for the holding apparatus and can thus contribute to cost efficiency and reliability.

In advantageous embodiments, the fastening system comprises, as a separate holding apparatus, a holding apparatus according to at least one of the design variants described above.

The invention also comprises an, in particular modular, fastening system having a cable tie, which again has a toothed cable tie strip and a cable tie head with a detent device for the detent engagement with the toothed cable tie strip, and having a holding apparatus (composed in particular of plastic) according to at least one of the embodiments described further above. The modular fastening system may also comprise a cable tie according to one of the embodiments described below.

It is essential here that the passage region of the holding apparatus and the cable tie are in each case adapted to one another in terms of their geometry for the abutment of the holding apparatus against the cable tie. In particular, here, an in each case complementary inner contour of the holding apparatus and an outer contour of the cable tie may be adapted to one another. In particular, the cable tie and the holding apparatus may also be adapted to one another in terms of their geometry for positive locking or for positively locking abutment of the holding apparatus on the cable tie. This has the advantage that the guidance by the guide slot is particularly exact, and possibly also the spacing of the material for binding from the holding apparatus can be exactly set. Here, the system can be adapted easily, flexibly and cheaply to a multiplicity of different uses.

In a preferred embodiment, the fastening system has a multiplicity of predetermined different cable ties, which are each adapted in terms of their geometry to a geometry of the passage region for the purposes of the abutment, in particular for the purposes of the positively locking abutment, of the passage region of the holding apparatus against the cable tie. This yields the advantage that, in the case of a given holding apparatus, it is possible in each case in accordance with the present intended use for the suitable cable tie, in particular the cable tie of suitable length for a diameter of the material for binding or of suitable mechanical stability for a weight of the material for binding or of suitable thermal stability for an expected temperature load imparted by the material for binding, to be selected. Thus, it is possible for one and the same, inexpensive component of the holding apparatus to be utilized with the typically relatively expensive special part, the cable tie, which is adapted to the specific intended use. In this case, too, flexibility and reliability of the holding arrangement are achieved in an inexpensive manner.

In a further particularly advantageous embodiment of the fastening system, the fastening system has a multiplicity of predetermined different holding apparatuses, the passage region of which is in each case adapted in terms of its geometry to a geometry of the cable tie, in particular of the cable tie head, for the purposes of the abutment, in particular for the purposes of the positively locking abutment, of the passage region of the holding apparatus against the cable tie. This yields the advantage that a material for binding which is suitable for a particular cable tie can be used without problems, by exchanging an inexpensively producible holding apparatus, in a multiplicity of different situations with different fastening feet and fastening facilities for the fastening of the holding apparatus to external components. In this case, too, cost savings are realized. Specifically with the embodiment of the previous paragraph, a modular system is thus realized by means of which, in a flexible and inexpensive manner, a solution which provides ease of assembly for the fastening of material for binding to a further component is achieved.

The invention also relates to a cable tie having a toothed cable tie strip and a cable tie head with a detent device for detent engagement with the toothed cable tie strip. The cable tie may in this case be manufactured in particular from plastic, for example in one piece. In particular, the cable tie is suitable or configured, or geometrically adapted, for example in terms of an outer contour, for a holding apparatus or a fastening system as described further above.

Here, the cable tie strip adjoins a front side of the cable tie head, wherein the main direction of extent of the cable tie strip defines the longitudinal direction of the cable tie.

The cable tie strip also has a width in a width direction and a thickness in a vertical direction of the cable tie. Here, in a fully assembled state in which the cable tie strip forms a loop by being inserted through the cable tie head and engages with detent action with the cable tie head, the width determines, with the radius of the loop, the size of the area, facing toward the material for binding, on the inner side of the cable tie strip, and the size of the surface, averted from the material for binding, on the outer side of the cable tie strip. The thickness of the cable tie strip in the vertical direction significantly determines the stability of the cable tie strip and the flexibility thereof, without influencing the size of the surface facing toward the material for binding and of the surface averted from the material for binding. Here, in the case of an increased thickness, the toothing can also be of more pronounced form, such that the detent device, for example in the form of a detent tongue or detent pawl, which engages into the toothing, also withstands greater forces. Furthermore, the thickness also determines the size of the surface regions situated at the edge sides of the cable tie strip, and can thus also determine an influence on a stability of guidance of the guide slots that interact with the edge sides.

In a preferred embodiment, provision is made for a respective marking to be formed in that end region of the cable tie strip which is remote from the cable tie head and on the outer side and/or an edge side of the cable tie head, wherein the markings are positioned such that, when the markings are aligned with one another, a loop with a maximum radius is formed by the cable tie. Here, the maximum radius is the radius up to which the cable tie strip can still be reliably engaged with detent action with the cable tie head. It is thus achieved that, without the cable tie being assembled and/or engaged with detent action, it can be easily identified whether the selected cable tie is suitable for a present material for binding.

Here, the cable tie strip has a hard component and has a soft component which is soft in relation to the hard component. The outer side and the edge sides of the cable tie strip are at least regionally, that is to say regionally or entirely, formed by the hard component. The soft component extends in the form of a strip on the inner side in the longitudinal direction of the cable tie strip along the hard component over a major part, that is to say more than 50 percent, preferably more than 90 or 95 percent, of the length of the cable tie strip. Here, the strip may also be interrupted in regions. In this case, the strip may for example be formed from a series of points or strips of the soft component arranged adjacent to one another. The soft component thus at least regionally forms the inner side of the cable tie strip. The soft component thus forms, at the inner side of the cable tie strip, an abutment surface for the material for binding. The abutment surface is in this case elevated (in the vertical direction) in relation to those regions of the inner side which are formed by the hard component.

The soft component may in this case comprise a silicone and/or a thermoplastic elastomer (TPE). The soft component may be applied in a production method for the cable tie either directly following a cable tie injection molding process, for example as a thermoplastic deformation (TPU) soft component, or else in a separate joining process, for example in the form of an application of liquid silicone or the attachment of an adhesive pad to the cable tie.

This yields the advantage that the material for binding is protected against abrasion as a result of contact with the hard component of the cable tie in the event of vibration and shock loading, by virtue of the fact that it holds or fixes the material for binding spaced apart from the hard component, in particular from the surface, formed by the hard component, on the inner side. Thus, by means of the holding apparatus, a touch-free or contact-free holding arrangement for the material for binding is realized. At the same time, as a result of the spacing, it is also achieved that the holding arrangement is protected against elevated temperatures of the material for binding or bundle, such that a holding arrangement that comes into contact only with the hard component can be manufactured from a less temperature-resistant and less expensive material. Moreover, by means of the soft component, an axial movement of the material for binding relative to the cable tie loop is prevented, because the soft component exhibits increased static friction in relation to the hard component.

The attachment of the soft component to the flexible cable tie moreover offers the advantage that profiles or structures can be realized in the soft component itself in a simple manner in terms of production. Since the cable tie strip is not inserted into the cable tie head during the production process, the inner side of the cable tie strip is, owing to the then straight form, readily accessible for a tool for the stamping or forming of the soft component. Here, the tool can also be removed again without problems from a cast structure or from a cast profile. Thus, the cable tie or the inner side thereof can be flexibly adapted to respective requirements. In a manner known for cable tie technology, the stated advantages here are expedient for large diameter variance for the material for bundling or binding with a small number of components, such that flexible, cost-saving use of the cable tie, in particular with a corresponding holding apparatus, or a corresponding fastening system, is realized.

The strip of the soft component may, in the cross section perpendicular to the longitudinal direction, that is to say in marginal regions which face toward the edge sides of the cable tie, be elevated, that is to say have an increased thickness in the vertical direction of the strip in relation to a central region. This yields the advantage of increased static friction perpendicular to the strip of the soft component, that is to say, in the fully assembled state, an improved prevention of axial movement of the material for binding in the cable tie. Furthermore, it is thus possible to realize improved thermal insulation, possibly by means of an air cushion between the marginal elevations, which air cushion is formed in the central region. The central region with reduced thickness in relation to the marginal regions of the soft component strip may in this case be designed for example as a groove.

The cable tie head may be formed entirely or partially, in particular predominantly, by the hard component. The cable tie head is formed predominantly from the hard component for example if it has a detent device with a metal tongue and is otherwise composed of the hard component. The cable tie head may in this case also converge in wedge-shaped fashion on the cable tie strip in the direction of the cable tie strip at the inner and/or outer side or at one or both edge sides. This yields the advantage that the above-described holding apparatuses can be particularly easily formed for receiving the cable tie head in positively locking fashion, whereby improved guidance and stability of the cable tie in the holding apparatus or the fastening system is achieved. Here, "converging conically on one another" may be understood in particular to mean that planar surfaces converge on one another.

In one advantageous embodiment, provision is made for the inner side to be formed at least regionally, that is to say regionally or entirely, by the hard component in marginal regions, adjoining the edge sides, of the cable tie strip. The marginal regions may in this case extend in the longitudinal direction of the cable tie strip over a major part of the cable tie strip, that is to say 50 percent or more, preferably 90 or 95 percent or more. Thus, in this case, the soft component forms an elevated central region on the inner side of the cable tie strip, which elevated central region is delimited in the direction of the edge sides by the marginal regions formed by the hard component. Thus, the width of the cable tie strip from edge side to edge side perpendicular to the longitudinal direction of the cable tie strip is greater than the width of the strip of the soft component. Guide rails are thus formed by those regions of the hard component which project beyond the strip of the soft component perpendicularly with respect to the longitudinal direction of the cable tie strip.

This yields the advantage that, firstly, the more sensitive soft component is mechanically protected against damage by the protruding margin of the hard component, and secondly, the protruding marginal region of the hard component also forms a thermal protection means of an associated holding apparatus of the cable tie for holding the cable tie on a further component, if the margin is situated between the holding apparatus and the material for binding. This is for example the case in the above-described embodiments relating to the holding apparatus. It is particularly important that the margin, that is to say the guide rails, can also be utilized for guiding and holding of the cable tie by means of a holding apparatus, for example by virtue of the marginal region formed by the hard component being regionally engaged around by arms of the holding apparatus with corresponding guide slots, as described above. Specifically the guiding and holding of the cable tie on the region formed by the hard component is advantageous here, because it results in guidance and hold with increased precision.

Here, provision may be made in particular for the soft component to form, additionally to the strip in a respective limit region of the strip adjoining the marginal regions of the cable tie strip, in each case one wing which, in a cross section in the width direction of the cable tie strip, proceeding from the strip of the soft component, extends spaced apart from the corresponding marginal region of the cable tie strip away from the cable tie strip and/or in the width direction away from the strip of the soft component.

This has the advantage that, in the case of the cable tie being used with one of the proposed holding apparatuses, contact between the material for binding and the holding apparatus, and corresponding abrasion of the material for binding, are prevented even more effectively.

In a further embodiment, provision is made for the hard component to have, between the marginal regions, a central part which is elevated in the vertical direction relative to the marginal regions and on which the soft component is arranged. This has the advantage that the spacing between the holding apparatus and the material for binding is increased, specifically by a thickness of the central part in the vertical direction, and the soft component does not need to be designed to be thicker for this purpose. This is advantageous for the stability of the cable tie.

Provision may alternatively or additionally be made for the cable tie strip to have, on an outer side, an aperture or groove which runs along the cable tie strip. The aperture may in this case run, like the soft component, over a major part of the cable tie strip, but preferably over the entire cable tie strip. This has the advantage that, with a material saving, a large thickness of the cable tie strip, with the advantages discussed in the preceding paragraph, is nevertheless achieved. Moreover, by means of a corresponding projection in the first support surface of the second guide slot of the corresponding holding apparatus, which projection engages into the aperture during the pushing-through action, the cable tie and thus the material for binding are reliably held in the intended position even under load.

Provision may alternatively or additionally be made for the marginal regions of the cable tie strip to each have a depression running along the cable tie strip. The depression thus runs on the inner side in the cable tie strip. In this way, by means of a corresponding lug, engaging into the depression, in the second guide surfaces of the second guide slot, slippage of the cable tie strip in the width direction in the event of a load-induced deformation of the cable tie strip can be impeded or prevented. This serves, in particular in combination with the aperture mentioned in the preceding paragraph, and in particular also with the corresponding projection in the holding apparatus, for particularly reliable guidance and hold of cable tie and material for binding.

In a further embodiment, provision is made for the thickness of the cable tie strip to decrease in the marginal regions toward the associated edge side. In particular, the thickness may at least regionally decrease linearly, such that the inner side of the cable tie strip is, in a cross section in the width direction, at least regionally inclined, in the marginal region, relative to the outer side of the cable tie strip. Here, it is preferable if the inner side is inclined, in the marginal region, by 15 degrees or with a predefined tolerance around 15 degrees. The tolerance may for example amount to 2 degrees or 5 degrees or 10 degrees or 15 degrees. This has the advantage that the spacing between hard component and material for binding is increased in the marginal region. Moreover, by means of the inclined profile of the inner side, a stability of the cable tie strip is also increased. Finally, it is correspondingly also possible in this way for the second support surfaces of the second guide slot to be designed to be inclined relative to the first support surface of the second guide slot, for example inclined by the stated 15 degrees. This reduces a bending load in the holding apparatus and moreover permits a greater spacing between holding apparatus and material for binding.

In an alternative embodiment, the invention may also encompass a cable tie with an elevated central region as described above, in the case of which the elevated central part is formed from the hard component rather than the soft component. In this case, a one-piece design of the cable tie composed of the hard component is advantageous. Here, cost advantages are realized, which is expedient for example if a relatively low thermal load on the cable tie and on a holding apparatus associated with the cable tie is expected. Thus, the advantages and advantageous embodiments described here and below for the soft component may also apply to embodiments in which, instead of the geometrical forms and components realized by means of the soft component, these are realized by means of the hard component.

Provision is made whereby, in a first end region, situated relatively close to the cable tie head, of the cable tie strip, the thickness of the soft component increases in ramped fashion toward an end of the cable tie strip facing toward the cable tie head, that is to say toward the cable tie head. Here, the thickness of the soft component in the region of the ramp may increase by a factor between 1.5 and 3.5, preferably by a factor of 2.5. This has the advantage that, firstly, a bending load that typically arises in the vicinity of the cable tie head in the fully assembled state can be at least partially compensated by virtue of the cable tie head being pressed against the material for binding. In particular, however, it is possible for a spacing between the binding agent and a holding apparatus in the region of the cable tie head to be ensured by means of the ramp. Thus, it is for example possible for the holding apparatuses mentioned further above to engage firmly around the cable tie head entirely or in regions at one or more sides, and to ensure precise guidance by means of corresponding guide slots, without the holding apparatus running the risk of approaching the material for binding, which is for example hot. Furthermore, that end of the ramp which faces toward the cable tie head may also be designed as an abutment surface for the holding apparatus, for example also as a detent surface with a bridge of the holding apparatus. For this purpose, it is then necessary in particular for a spacing between the abutment surface of the ramp and a front side of the cable tie head or a guide surface for the cable tie strip in the cable tie head to be adapted to the geometric dimensions of the bridge.

In particular, provision may be made here whereby the soft component, in the end region with the increased thickness, of the ramp, has a lip on the inner side of the cable tie strip, which lip is spaced apart from the hard component, that is to say has a non-zero spacing, and which extends from the end region of increased thickness, that is to say of the ramp, in the direction of the cable tie head. The lip may preferably in this case also extend away from the cable tie strip. The lip can thus be understood in particular to be a continuation of the ramp in the direction of the cable tie head, which preferably, toward the cable tie head or the rear side of the cable tie head, moves increasingly further away from the cable tie strip. Thus, the soft component has, in particular in the first end region, a positively demolded geometry.

The lip may also be referred to as a wing which is cantilevered in a longitudinal direction of the cable tie strip. In particular, the lip may, in a projection perpendicularly onto the inner side of that end of the cable tie which is close to the cable tie head, or onto the cable tie head, approach a guide surface of the cable tie head or extend as far as the guide surface. Here, the guide surface serves for the guiding of the inner side of the cable tie strip in the cable tie head. If the lip extends as far as the guide surface, then the lip can touch an inner side of the cable tie strip pushed through the cable tie head, or touch the inner side at least when material for binding has been bound.

This has the advantage that the spacing between the ramp and an inner side of the detent device in the cable tie head is reduced, and thus a gap which during the detent engagement of the cable tie head with the cable tie strip between different regions of the soft component in the region of the cable tie head is reduced in size. Thus, the risk of a material for binding coming into contact with the holding device is also reduced. If the cable tie is used without one of the proposed holding apparatuses, then in relation to the ramp without a lip, it is possible for a rounder loop to be achieved with the corresponding material for binding, which increases the flexibility of the use of the cable tie.

In another preferred embodiment, provision is made whereby, in a second end region of the cable tie strip which is further remote from the cable tie head, toward an end of the cable tie strip averted from the cable tie head, the soft component has a ridge. This may be formed by virtue of the thickness of the soft component in the second end region first increasing in the direction of the end averted from the cable tie head, before then decreasing or tapering to 0. Here, the soft component thus comprises a ramp-like ridge. The total thickness of the cable tie strip may, in the region of the ramp-like ridge, exceed an opening size of an opening for the insertion and detent engagement of the cable tie strip in the cable tie head. This is not a problem because, during the insertion of the cable tie strip into or through the cable tie head, the cable tie strip is deformable in the second end region. At the same time, the cable tie strip is not toothed in the second end region, such that an insertion of the second end region of the cable tie strip into the cable tie head does not lead to a detent engagement of the cable tie head with the cable tie strip.

This has the advantage that the cable tie can firstly be inserted with the second end region into or through the cable tie head without the toothed cable tie strip engaging with detent action—which is often releasable only with difficulty or using the tool—with the detent device of the cable tie head. At the same time, the soft component, or the ramp-like ridge formed by the soft component, however ensures, after the ridge has been inserted through the cable tie head, that the cable tie strip does not inadvertently release from the cable tie head again of its own accord. Notwithstanding this, the preassembly of the cable tie achieved in this way can however be released again without tools, which increases the flexibility in the assembly process.

In a further embodiment, provision is made for the hard component to have, on the outer side in the second end region, in particular adjacent to the corresponding end, an elevated sliding projection. The sliding projection is preferably arranged centrally. In particular, the sliding projection is of spherical-segment-shaped form. The sliding projection makes it easier for the cable tie to be pushed through the holding apparatus, and is advantageous specifically in the case of a holding apparatus of which the second guide slot has an arched first support surface, because, by means of the sliding projection, the cable tie is prevented from hooking into the second guide slot.

In another advantageous embodiment, provision is made for a detent spring element to be provided in the cable tie strip between the second end region and the toothing and/or between the end region and the soft component. This has the advantage that the cable tie can firstly be inserted with the second end region into or through the cable tie head without the toothed cable tie strip engaging with detent action—which is often releasable only with difficulty or using a tool—with the detent device of the cable tie head. At the same time, the detent spring element ensures, after the ridge has been inserted through the cable tie head, that the cable tie strip does not inadvertently release from the cable tie head again of its own accord. Notwithstanding this, the preassembly of the cable tie achieved in this way can however be released again without tools, which increases the flexibility in the assembly process. The above-described ramp-like ridge can in this case prevent the cable tie strip from being inadvertently pushed further through the cable tie head and engaging with detent action with the toothing in the cable tie head.

In a further advantageous embodiment, provision is made for the soft component to have, on the inner side, a groove which extends over a major part of the strip of the soft component along the strip of the soft component. Here, the cable tie head has, in the opening for the pushing of the cable tie strip through the cable tie head, on an inner side of the opening, a projection which projects into the groove as the cable tie strip is pushed through the opening. This has the advantage that the stability of the cable tie head is increased, and improved guidance of the cable tie strip by the cable tie head is achieved. What is particularly advantageous here is the combination with the ramp-like ridge of the soft component as described in the preceding paragraph, which may for example be arranged at the end of the groove and in the case of which the projection then interacts with the ramp-like ridge in order to achieve the advantages stated in the preceding paragraph.

The projection may also be provided independently of the groove. Both in the presence of a groove and in the absence of a groove, the projection may be designed to project to such an extent, and the cable tie strip may be designed correspondingly, such that, when the cable tie strip has been pushed through the cable tie head, the spacing between the hard component and the projection is smaller than the thickness of the soft component, that is to say the soft component is deformed by the projection. Owing to the relatively close proximity of the projection to the hard component, the deformation of the cable tie strip under the action of a tensile load is reduced owing to improved support of the cable tie strip, and thus the reliability of the cable tie is increased. This deformation is, owing to the soft component, more pronounced than in conventional cable ties.

In another embodiment, provision is made for a detent edge, by means of which the detent tongue engages into the toothing of the cable tie strip, to be curved in the width direction. It is thus achieved that, in the event of a load-induced deformation of the cable tie strip, the detent tongue remains in engagement with the toothing over the entire width of the detent edge. This results in increased reliability of the cable tie, which is important specifically owing to the deformation under load which is more difficult to control owing to the soft component.

In a further embodiment, provision is made for the detent tongue to be wider at the detent edge than in a region of the detent tongue which does not come into contact with the toothing during the detent engagement of the cable tie strip with the cable tie head. In the event of load on and deformation of the cable tie strip, this has the effect that the marginal regions of the then arched cable tie strip do not push the detent tongue out of the detent engagement, because the marginal regions of the detent edge can deflect. In this way, too, the reliability of the cable tie is increased.

In a further particularly advantageous embodiment, provision is made for the soft component to extend in the form of at least two strips on the inner side in the main direction of extent, the longitudinal direction, of the cable tie strip along the hard component over a major part of the cable tie strip. Here, it is possible in particular for a toothing for the detent device of the cable tie head to be formed between the strips by the hard component. In this case, an internally toothed cable tie strip is formed which has soft component strips to the sides of the toothing. Alternatively, it is possible here or in the other stated embodiments for the toothing to also be formed on the outer side, formed by the hard component, of the cable tie strip. In this case, an externally toothed cable tie strip is formed.

The advantage is achieved here of additional thermal insulation by means of the air cushion between the strips. Furthermore, the toothing is thus particularly well protected against dirt, such that an impairment of the load-bearing capability of the detent connection between cable tie head and cable tie strip is ruled out even under adverse conditions. On the outer side, too, the cable tie is thus contaminated with dirt less, or is easier to clean. Through the use of the at least two strips of the soft component, it is also possible for static friction in an axial direction in the fully assembled state to be increased.

In a further particularly advantageous embodiment, provision is made for the soft component or the strip or the strips of the soft component to have a profile or a structure on the inner side. The structure or the profile may in this case have a structure or profile depth which amounts to between 33 and 66 percent of the thickness of the soft component, preferably between 45 and 55 percent. This has the advantage that static friction and protection of the material for binding against abrasion as a result of contact with solid materials in the event of vibration and shock loading can be improved.

Here, provision may be made in particular for the profile to have a row, preferably two, in particular parallel, rows, of triangles arranged in alternating fashion along the longitudinal direction of the cable tie strip. Here, the triangles may in particular be identical. The tips of the triangles are in this case oriented preferably perpendicular to the longitudinal direction of the cable tie or cable tie strip. Specifically the stated embodiments of the profile have proven here, in tests, to be particularly advantageous and expedient for limiting an axial movement of the material for binding. Moreover, the stated structures are difficult to realize in terms of production on a convex surface, such that here the attachment to the cable tie yields particular advantages.

In a further advantageous embodiment, provision is made for the hard component to have, on the inner side, in a surface region covered by the soft component, a coupling element, but preferably a multiplicity of coupling elements, arranged in positively locking and non-positively locking fashion on the soft component. Here, the hard and soft components may in particular form by undercuts, preferably by encapsulation of the soft component with the hard component. This has the advantage that the hard and soft components are particularly closely connected to one another, and also remains in a fixed and defined manner on the hard component, and thus holds the material for binding reliably and flexibly in the predefined position, even during a deformation of the flexible cable tie, for example during the final assembly, in which the cable tie strip is inserted through the cable tie head and is engaged with detent action therein.

Here, the coupling element may comprise a pocket, in particular a pocket with an undercut, and/or a peg, in particular a mushroom-shaped peg. Alternatively or in addition, the coupling element may comprise a groove and/or elevated rail running parallel to the longitudinal direction of the cable tie strip. In this way, it is possible to realize a reliable connection between hard component and soft component, for example by encapsulation of the soft component with the hard component, or adhesive bonding of the soft component to the hard component. Since groove and rail in this case permit a degree of play of soft component relative to hard component in the longitudinal direction, the final assembly of such a cable tie can be performed with particularly free movement.

The invention also relates to an assembly method for fastening a material for binding by means of a holding apparatus and a cable tie to a further component.

Here, the holding apparatus is manufactured at least partially, that is to say partially or entirely, preferably predominantly, from plastic, and has a fastening foot for the fastening of the holding apparatus to the further component, and a fastening head which is arranged in the fastening foot and which has a passage region for the pushing-through of a cable tie strip through the holding apparatus and for the holding of the cable tie on the holding apparatus. Here, the holding apparatus may be formed either entirely from plastic, or at least the fastening head may be manufactured entirely from plastic. The cable tie has a toothed cable tie strip and a cable tie head with a detent device for detent engagement with the toothed cable tie strip when the cable tie strip is pushed through the cable tie head.

Here, the method comprises the following steps: fastening of the holding apparatus to the further component. First pushing-through of the cable tie strip through the passage region of the holding apparatus. Fastening of the material for binding to the cable tie and thus to the holding apparatus, comprising forming of a cable tie loop around the material for binding, with inserting of the cable tie strip through the cable tie head. Here, the material for binding is held exclusively by means of the cable tie on the holding apparatus, specifically with a spacing, that is to say in contact-free fashion. This is realized in that the cable tie is received with an accurate contour in the passage region of the holding apparatus by at least two differently oriented guide slots with in each case a pair of oppositely oriented support surfaces, wherein, by means of a first guide slot with a first pair of support surfaces, the cable tie is held in abutment against surface regions on edge sides of the cable tie head and/or of the cable tie strip, and the cable tie head and/or the cable tie strip is arranged in each case at least partially between the respective pairs of support surfaces of a guide slot. In particular, here, only the inner side of the cable tie, for example in the central part which is elevated in relation to the internally situated marginal regions of the inner side, makes contact with the material for binding. In particular, the cable tie may be held in the passage region of the holding apparatus by means of a second guide slot with a second pair of support surfaces in abutment against surface regions at the internally situated marginal regions of the cable tie strip. Here, the marginal regions are separated by an internally situated central region, in which the cable tie is not held in abutment with the holding apparatus.

In one advantageous embodiment, provision is made for the binding of the cable tie loop around the material for binding to comprise a second pushing-through of the cable tie strip through the passage region of the holding apparatus.

The advantages and advantageous embodiments mentioned for the holding apparatus, the fastening system and the cable tie apply here correspondingly to the assembly method.

The features and feature combinations mentioned above in the description and the features and feature combinations mentioned below in the description of the figures and/or shown in the figures alone may be used not only in the respectively specified combination but also in other combinations without departing from the scope of the invention. Thus, the invention is to be regarded as also encompassing and disclosing embodiments which are not explicitly shown and discussed in the figures, but which emerge and can be generated from the discussed embodiments by means of separated feature combinations. Therefore, embodiments and feature combinations are also to be regarded as being disclosed which do not have all of the features of an originally worded independent claim. Furthermore, in particular by the embodiments presented above, embodiments and feature combinations are to be regarded as being disclosed which go beyond, or depart from, the feature combinations realized in the back-references of the claims.

With regard to the definition of positively locking abutment: positively locking connections arise as a result of the engagement of at least two connecting partners into one another. The connecting partners thus cannot be released from one another even in the absence of a transmission of force or in the case of an interrupted transmission of force. In other words, in the case of a positively locking connection, one connecting partner stands in the way of the other. In the presence of operational load, pressure forces act normally, that is to say at right angles, with respect to the surfaces of the connecting partners. Such "blockages" arise in at least one direction. If a second homogeneous surface pair is arranged opposite, the opposite direction is also blocked. If the pair is composed for example of two mutually coaxial cylinder surfaces, there is positive locking in all directions of the plane perpendicular to the cylinder axis.

BRIEF DESCRIPTION OF THE SEVERAL VIEWS OF THE DRAWING

Exemplary embodiments of the invention will be discussed in more detail below on the basis of schematic drawings, in which:

FIG. 7 shows a perspective view of a third exemplary holding apparatus with an exemplary embodiment of a cable tie which has been pushed through the holding apparatus to such an extent that its cable tie head has reached an end position;

FIG. 8 shows a further perspective view of that which is shown in FIG. 7;

FIG. 9 shows the holding apparatus and the cable tie from FIG. 7 in a fully assembled state;

In the figures, identical or functionally identical elements are denoted by the same reference designations.

DETAILED DESCRIPTION OF THE INVENTION

Figure 1:
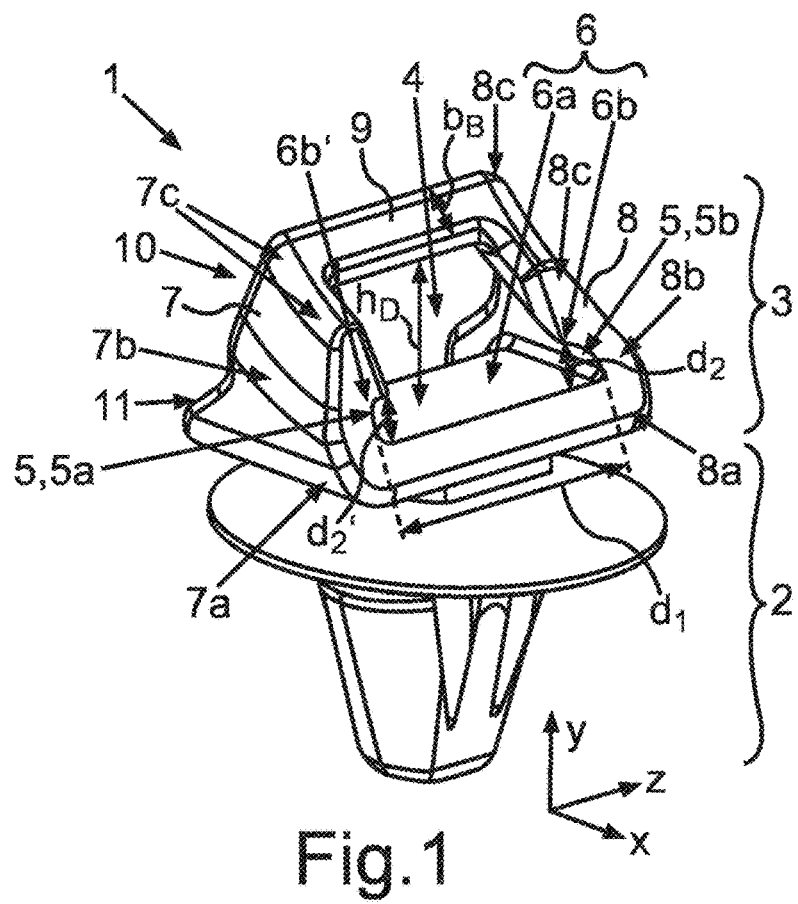
FIG. 1 shows a perspective view of a first exemplary embodiment of a holding apparatus.

FIG. 1 shows a first exemplary embodiment of a holding apparatus. In the present case, the holding apparatus 1 shown is equipped with a fastening foot 2 and a fastening head 3, which are arranged one above the other in a y direction as vertical direction. Here, the fastening foot 2 has a passage region 4 for the pushing of a cable tie strip 17 (FIG. 2) of a cable tie 13 (FIG. 2) through the holding apparatus 1 and for the holding of the cable tie 13 on the holding apparatus 1. Here, the passage region 4 has, for receiving the cable tie with an accurate contour, at least two differently oriented guide slots 5, 6 with in each case a pair of oppositely oriented support surfaces 5a, 5b and 6a, 6b, 6b' respectively. The support surface pairs may each have support surfaces 5a, 5b and 6a, 6b, 6b' arranged parallel.

In the example shown, the fastening head 3 also has two arms 7 and 8 in the passage region 4. The arms each have a foot region 7a, 8a facing toward the fastening foot 2, an end region 7c, 8c averted from the fastening foot 2, and a respective central region 7b, 8b situated between foot region 7a, 8a and end region 7c, 8c. In this example, the respective central regions 7b, 8b have the internally situated support surfaces 5a, 5b, facing toward one another, of the first guide slot 5.

In the example shown, it is also the case that the foot region 7a, 8a of the two arms 7, 8 forms or provides the first support surface 6a of the second guide slot 6. The first support surface 6a of the second guide slot 6 thus at least regionally comprises the two foot regions 7a, 8a. In the example shown, the first support surface 6a is planar and extends in the x-z plane, in this case perpendicular to the vertical direction or y direction. The normal vector of the first support surface 6a thus points in the positive y direction. In the example shown, the respective further support surface 6b, 6b' is arranged in the end regions 8c, 7c of the two arms 7, 8, or is formed by the arms 7, 8. These have, in the present case, a normal vector which points in the negative y direction. Correspondingly, the support surfaces 6a and 6b, 6b' are oriented oppositely, and in the present case are also arranged opposite one another. Between them, there is provided a free space for receiving the cable tie 13, such that, for example in a fully assembled state, a region of the cable tie strip 17 is arranged between the respective support surfaces 6a and 6b, 6b'.

Figure 10:
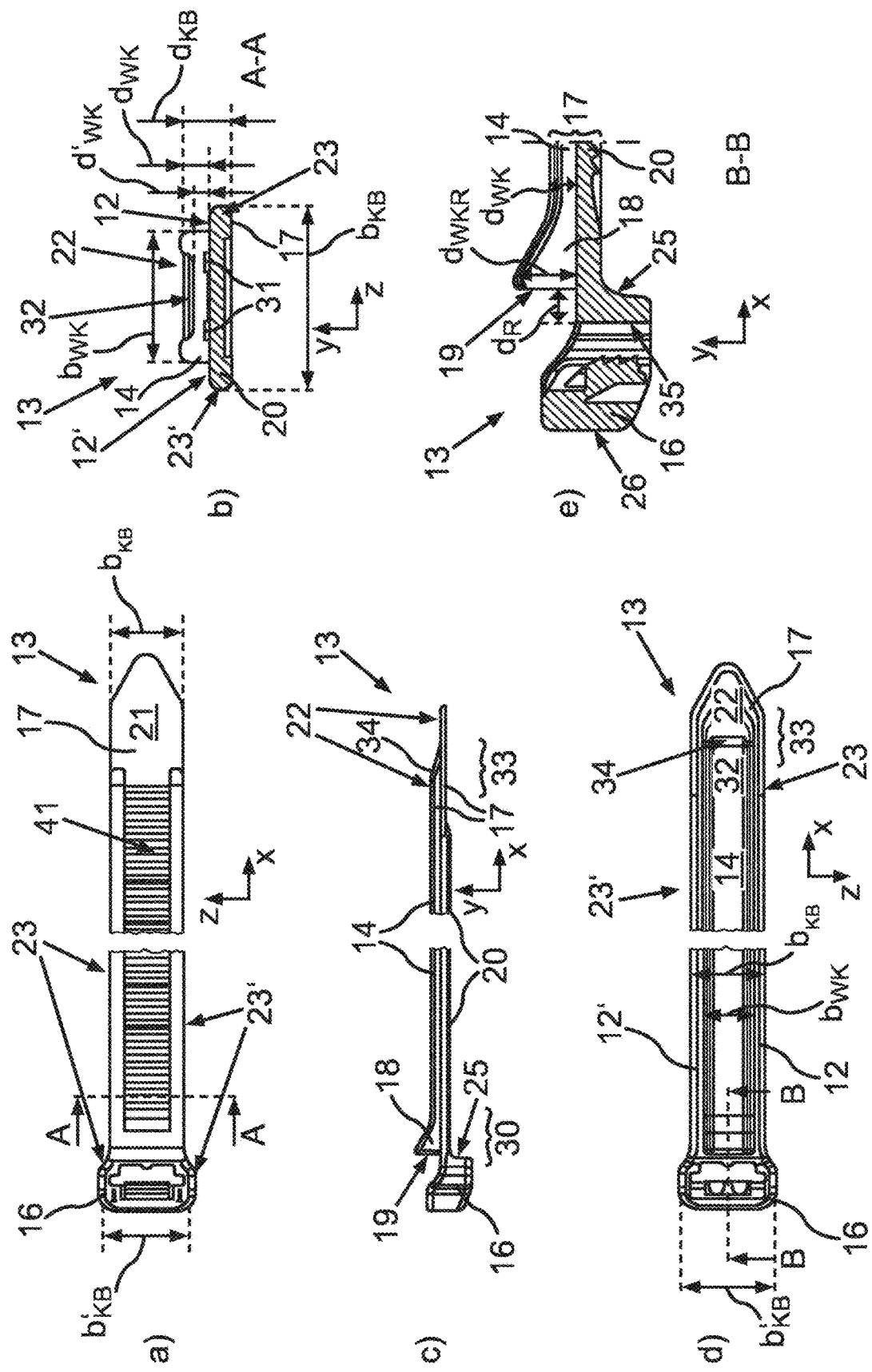
FIGS. 10a-e show various sides and sectional views of an exemplary embodiment of a cable tie.

In the example shown, the further support surfaces 6b, 6b' are tilted in the x-y planes toward the first support surface 6a of the second guide slot 6, resulting in a cone or funnel which tapers in the positive x direction. This has the effect that, when the cable tie 13 is pushed through the passage region 4 in the x direction, which can then be referred to as pushing-through direction D (FIG. 2), the cable tie 13 can be guided with an accurate contour toward the guide slot. Here, the first support surface 6a is designed for the abutment or for the guidance of the cable tie 13, which is pushed through the passage region 4, against an outer side 21 (FIG. 3), which in the fully assembled state is averted from a material for binding 39 (FIG. 14), of the cable tie 13, and the further support surfaces 6b, 6b' are designed for abutment against respective marginal regions 12, 12' (FIG. 2) of the cable tie 13, which in a fully assembled state are oriented toward the material for binding 39. The marginal regions 12, 12' in this case adjoin in each case one edge side 23, 23' (FIG. 3) of the cable tie 13 and are separated from one another by a middle or central region on the inner side 22 (FIG. 3) of the cable tie 13. A spacing $d_2$ between the first support surface 6a and one further support surface 6b or $d_2'$ between the first support surface 6a and the other further support surface 6b' is thus adapted to a thickness $d_{KB}$ (FIG. 10) of the cable tie 13, in the present case in the marginal regions 12, 12', in order to guide the cable tie in particular in positively locking fashion. The thickness $d_{KB}$ of the cable tie 13 in the marginal regions 12, 12' is in this case measured in an axial direction in a fully assembled state.

In the example shown, the first support surfaces 5a of the first guide slot has a normal vector which points in the positive z direction, and the second support surface 5b has a normal vector which points in the negative z direction; the support surfaces are thus oriented differently, in the present case oppositely. Here, the two support surfaces 5a, 5b run parallel in each case in the y-x plane, though they could also, for the purposes of easier insertion, be inclined slightly relative to one another, that is to say for example by a magnitude of less than 5, less than 10 or less than 15 degrees. Since the passage region 4 extends between the two support surfaces 5a, 5b, that is to say the support surfaces are separated by an empty or free space, the cable tie 13 is arranged between the two support surfaces 5a, 5b in the fully assembled state. In the present case, the two support surfaces are also situated opposite one another. Here, a spacing $d_1$ of the two support surfaces 5a, 5b to one another, in particular a minimum spacing $d_1$ of the two support surfaces 5a, 5b to one another, is adapted to a width $b_{KB}$, $b_{KB}'$ (FIG. 10) of the cable tie 13 to be held by the holding apparatus 1, in particular for the purposes of the positively locking abutment of the two support surfaces 5a, 5b against the edge sides 23, 23' of the cable tie 13.

In the present case, the two guide slots 5, 6 also open into one another, and the respective support surfaces 5a, 5b, 6a, 6b, 6b' transition into one another. In a cross section perpendicular to the respective support surfaces 5a, 5b, 6a, 6b, 6b', the support surfaces thus form a regionally deformed open ring, which guides the cable ties 13 in two axes of translation and correspondingly limits the translational movement to one remaining translational direction.

The guide slots 5, 6 are in this case, in the example shown, tilted relative to one another by approximately 90 degrees, wherein the orientation of a guide slot 5, 6 is defined by the mean orientation of the support surfaces 5a, 5b, 6a, 6b, 6b' associated with the guide slot 5, 6. The mean orientation may be determined for example by subtracting the normal vectors of the support surfaces 5a, 5b, 6a, 6b, 6b' respectively associated with a guide slot 5, 6.

In the example shown, the two arms 7, 8 are connected in their end regions 7c, 8c by a bridge 9. In this way, a hole-like passage is formed in the passage region 4, which passage is delimited by the support surfaces 5a, 5b, 6a, 6b, 6b' and by the bridge 9. Here, it is for example possible for the height $h_D$ of the passage region in the y direction to be limited to a height $h_D$ by the bridge 9. The height $h_D$ may in this case be smaller than and/or equal to a maximum height of the cable tie strip, that is to say a maximum thickness do of the cable tie strip 17 in a vertical direction. In this case, the vertical direction is the y direction.

In the example shown, a width $b_B$ of the bridge 9 is also predefined in targeted fashion. In the example shown, the width $b_B$ is measured parallel to the pushing-through direction D, in this case the x direction, and parallel to the further support surfaces 6b, 6b' of the second guide slot 6. It serves for the detent engagement of a cable tie 13, which is to be pushed through into the passage region, with a corresponding detent surface 19 (FIG. 2) of the cable tie strip 17 from the inner side 22 thereof. This can be seen in detail from FIG. 2. Here, the width $b_B$ corresponds for example to a spacing $d_R$ (FIG. 10) on the cable tie 13 between a front side 25 (FIG. 10), facing toward the cable tie strip 17, of the cable tie head 16 and a detent surface 19, facing toward the cable tie head 16, of a ramp 18 (FIG. 2) as detent projection of the cable tie strip 17. Here, the width $b_B$ may also alternatively for example correspond to a spacing on the cable tie 13 between a guide surface 35 (FIG. 10) in the interior of the cable tie head 16 and the detent surface 19 facing toward the cable tie head 16.

Finally, in the present case, the holding apparatus 1 also has, on the bridge 9 and the arms 7, 8, an abutment surface 10, at least oriented substantially perpendicular to the pushing-through direction D, for the abutment of a surface region of the front side 25, facing toward the cable tie strip 17, of the cable tie head 16. The abutment surface 10 in the present case comprises the bridge 9 and the end regions 7c, 8c of the two arms 7, 8 in their entirety, and partially also the central regions 7b, 8b. In that region of the abutment surface 10 which is close to the fastening foot, the abutment surface is adjoined by a guide surface 11 which is at least regionally formed by the foot region 7a, 8a of the two arms 7, 8. In the example shown, the guide surface 11 is planar and is inclined about the z axis, such that, during a pushing-through action in the pushing-through direction D, the cable tie 13 is rotated about the z axis as soon as the cable tie head 16 abuts against the guide surface 11, and the internally situated marginal regions 12, 12' are pressed against the support surfaces 6b and 6b'.

Figure 2:
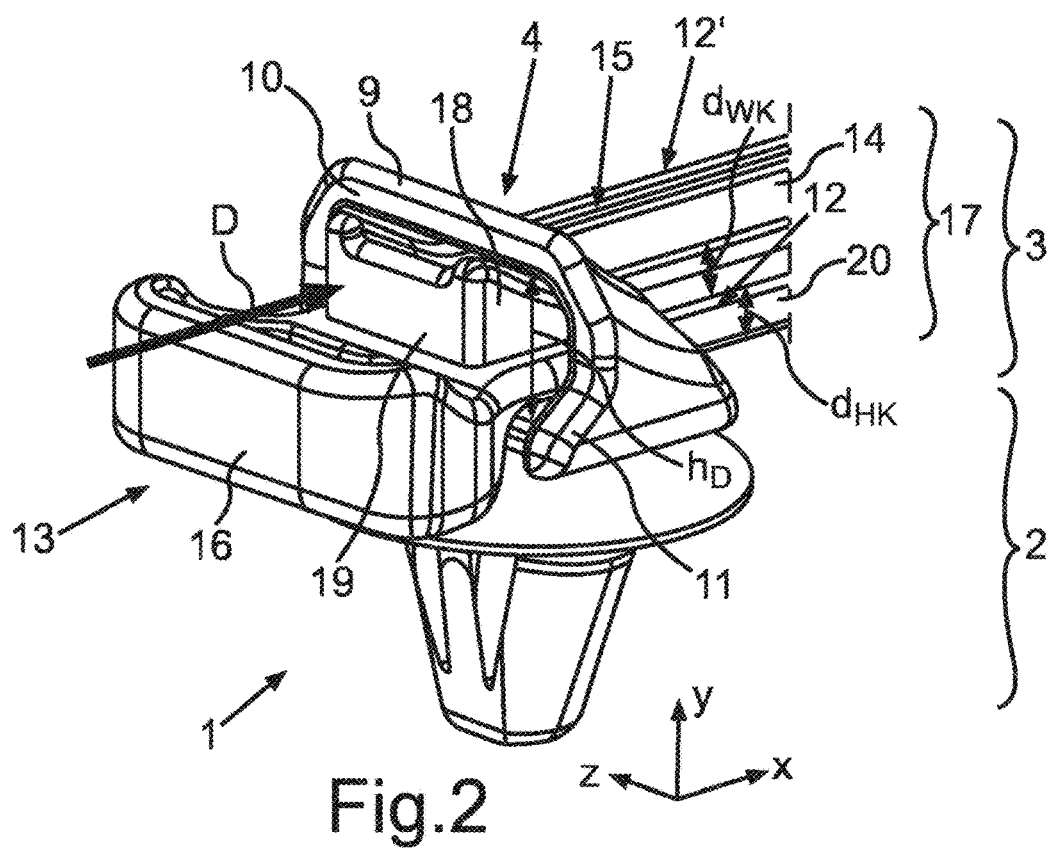
FIG. 2 shows a further perspective view of the embodiment from FIG. 1, as an exemplary embodiment of a cable tie is being pushed through the holding apparatus.

FIG. 2 shows the holding apparatus from FIG. 1 as a cable tie 13 is pushed through the passage region 4 of the holding apparatus 1. Here, in this example, the cable tie 13 has a soft component 14 on the inner side 22. The soft component 14 is formed as a strip and forms an abutment surface 15 for the material for binding 39. The soft component 14 is attached to the inner side 22 of the cable tie strip 17, adjoining the cable tie head 16, in the middle or central region between the marginal regions 12, 12'. Here, in an end region of the cable tie strip 17 close to the cable tie head, the soft component 14 forms a ramp 18.

The ramp 18 is formed for example by virtue of the thickness $d_{WK}$ of the soft component 14 increasing in the y direction in the direction of the cable tie head 16. Here, the ramp 18 forms, with the end of the soft component 14, an abutment surface or detent surface 19 which is oriented toward the cable tie head 16. In the example shown, the thickness $d_{HK}$ of the hard component 20 and the thickness $d_{WK}$ of the soft component 14 are, in a region of the ramp 18, collectively greater than the height $h_D$ of the passage region 4. This has the result that, as the cable tie 13 is pushed through the passage region 4, when the cable tie head 16 approaches the holding apparatus 1, there is a slight resistance that must be overcome before the detent surface 19 of the ramp 18 engages with detent action with the bridge 9.

As the cable tie 13 is pressed against, and engaged with detent action with, the holding apparatus 1, it is now the case in this example that the inclined guide surface 11 causes the cable tie head 16 to be pressed in the positive y direction against the bridge 9, such that the engagement of the bridge 9 with detent action with the ramp 18 is ensured. Furthermore, in this way, the marginal region 12, 12' is pressed against the support surfaces 6b' and 6b.

Figure 3:
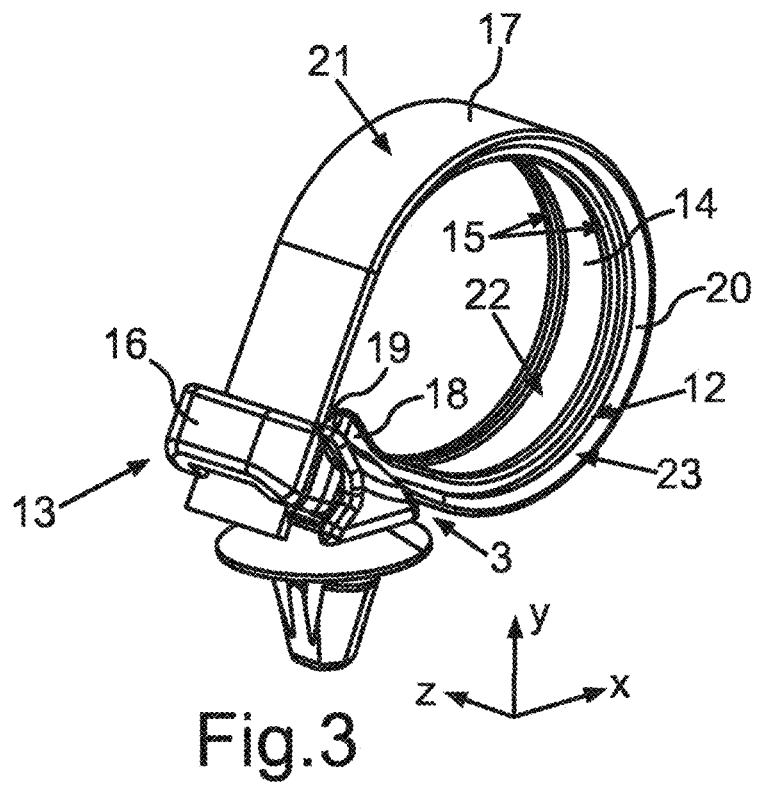
FIG. 3 shows the holding apparatus from FIG. 1 with an exemplary embodiment of a cable tie in a fully assembled state without material for binding.

FIG. 3 now shows the holding apparatus 1 from FIG. 1 with the exemplary cable tie 13 from FIG. 2 in a fully assembled state. Here, the cable tie 13 has been pushed through the passage or passage region 4 until the cable tie head 16 and the ramp 18 has engaged with detent action with the detent surface 19. Here, the cable tie strip 17 has been inserted through the cable tie head 16 and engaged with detent action therewith. A toothing of the cable tie strip 17, such as would be expected in the present case on the outer side 21 of the cable tie strip 17, is not illustrated here for the sake of clarity. Here, in addition to the soft component 14 and the hard component 20 of the cable tie 13, the inner side 22 thereof and the marginal regions 12 of the inner side and the edge sides 23 are furthermore also shown. In this example, a material for binding 39 would now extend in the z direction through the loop formed by the cable tie 13. Here, the material for binding, in abutment against the abutment surface 15 formed by the soft component 14, would be held spaced apart from the rest of the inner surface 22, in particular the marginal regions 12, 12'. Thus, the material for binding 39 would be held with a predefined spacing both of the hard component 20 of the cable tie 13 and of the holding apparatus 1. In the example shown, the ramp 18 is crucial for the holding, in contact-free fashion, of with the spacing $d_A$ (FIGS. 12 and 14) to the holding apparatus 1.

Figure 4:
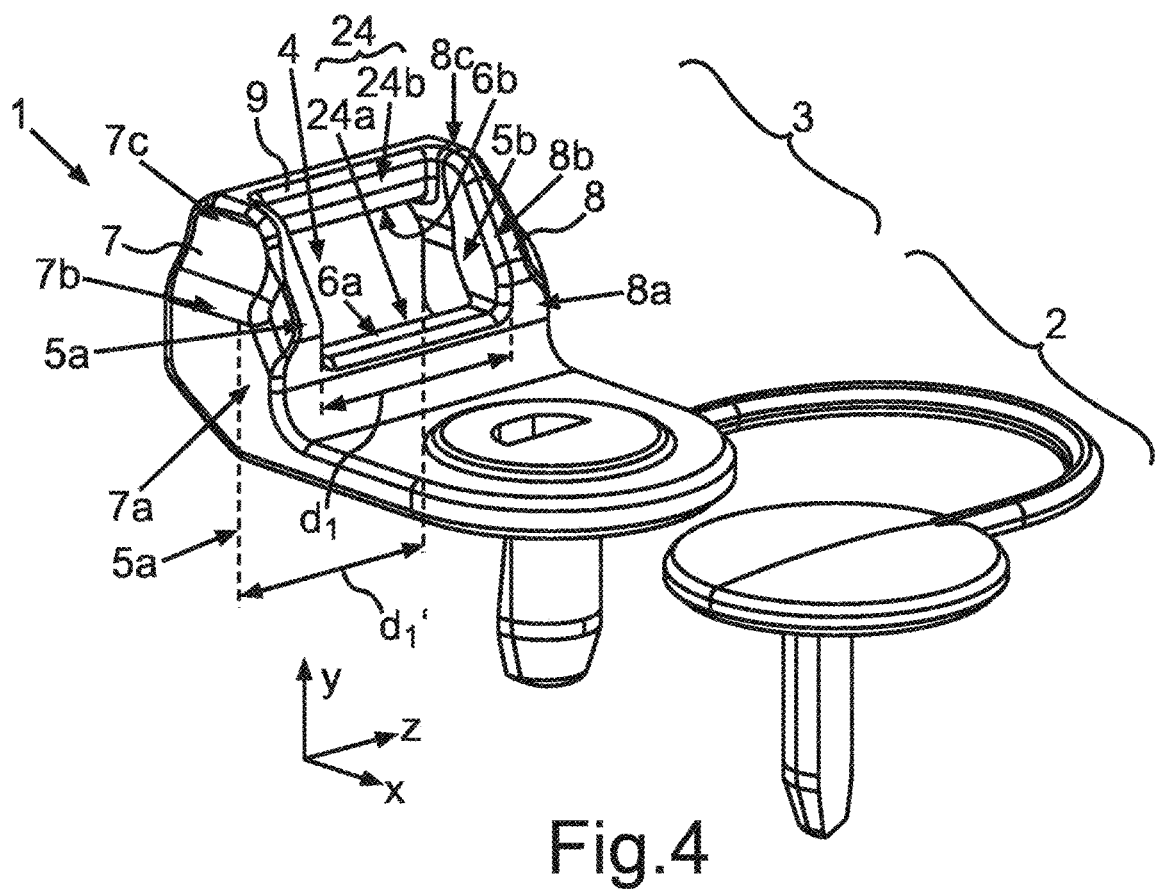
FIG. 4 shows a perspective view of an exemplary further embodiment of a holding apparatus.

FIG. 4 now shows another exemplary embodiment of a holding apparatus 1. As in the case of the holding apparatus 1 shown in FIGS. 1 to 3, the present holding apparatus 1 has a fastening head 3 with two arms 7, 8 and with a bridge 9 which connects the arms 7, 8 in an end region 7c, 8c averted from a fastening foot 2. In this way, a hole-like passage region 4 is realized, but at the same time a cage-like structure for the cable tie head 16 (FIG. 5) is also provided.

As is already known from the preceding exemplary embodiment, it is also the case here that the support surfaces 5a, 5b of the first guide slot 5 are provided on internally situated side surfaces of the arms 7, 8. In the example shown, the support surfaces are of planar design and extend in each case in the x-y plane along the arms 7, 8 from the central region 7b, 8b to the end region 7c, 8c. As is known from the preceding exemplary embodiment, the two support surfaces 5a, 5b of the first guide slot 5 transition, in that region of the support surfaces 5a, 5b which faces toward the fastening foot 2, into one support surface 6a of the second guide slot 6. In this case, too, that is to say in this example, the two support surfaces 5a, 5b are designed for abutment against edge sides 23, 23' of a cable tie 13 to be pushed through the passage region 4.

Here, the one support surface 6a of the second guide slot 6 has a normal vector which points in the positive y direction; however, in the example shown, the corresponding further support surface 6b of the second guide slot 6 is oriented oppositely, with a corresponding normal vector pointing in the negative y direction. Here, however, the support surfaces 6a, 6b are offset in the x direction. This has the effect that, in a fully assembled state, as shown for example in FIG. 6, the one support surface 6a is arranged in abutment with the outer side 21 of the cable tie 13, and the further support surface 6b is arranged in abutment with a front side 25, facing toward the cable tie strip 17, of the cable tie head 16. This results in a particularly advantageous and stable hold of the cable tie 13.

Furthermore, the embodiment shown now has a third guide slot 24 with oppositely oriented, in this case parallel, support surfaces 24a, 24b. In the example shown, the support surfaces 24a, 24b are also offset with respect one another, specifically in the present case in the y direction. One support surface 24a of the third guide slot 24 is in this case oriented in the negative x direction, and in this example adjoins one support surface 6a of the second guide slot 6, and/or the support surface 6a transitions into the support surface 24a. Here, the support surface 24a is at least regionally formed by the foot region 7a and 8a of the two arms 7, 8 and/or adjoins the foot region 7a and 8a. The further support surface 24b, which is oriented in the positive x direction, is formed in the example shown by the bridge 9, and transitions into the end regions 7c, 8c of the arms 7, 8 and/or the support surfaces 5a, 5b of the first guide slot 5. Thus, the guide slots 5, 6, 24 form a stable cage in which the cable tie 13 is reliably held in the region of the cable tie head 16. Here, in the example shown, the respective guide slots 5, 6, 24 are oriented with their support surfaces 5a, 5b, 6a, 6b, 24a, 24b in each case entirely perpendicular or substantially perpendicular to one another. They may also be arranged at some other angle between 75 and 105 degrees, preferably between 85 and 95 degrees with respect one another. The substantially perpendicular orientation with respect one another yields the advantage of particularly good guidance of the cable tie 13 in the cage-like holding apparatus 1.

Figure 5:
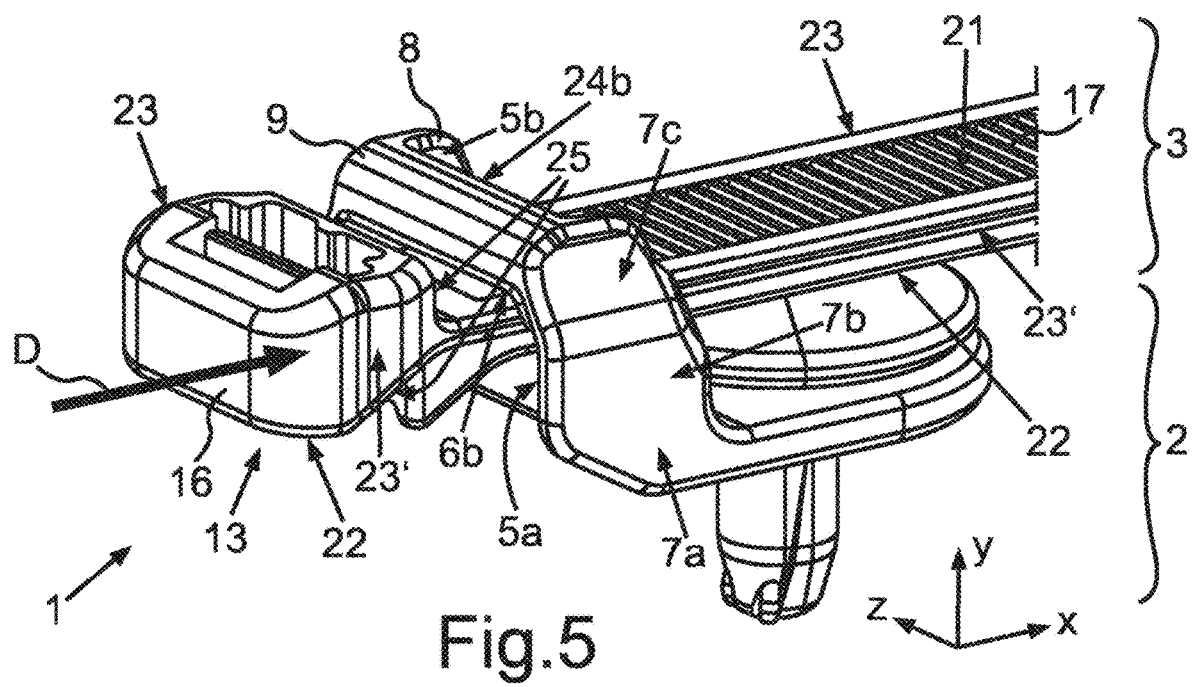
FIG. 5 shows a further perspective view of the embodiment from FIG. 4, as an exemplary embodiment of a cable tie is being pushed through the holding apparatus.

FIG. 5 now shows the holding apparatus 1 from FIG. 4 with a cable tie 13 which has been partially pushed through the passage region 4 in the pushing-through direction D. Here, the cable tie 13 is again shown in an exemplary embodiment. In the variant shown, in the pushing-through configuration shown, the cable tie 13 has been pushed in the positive x direction through the passage region 4, with the outer side 21 oriented in the positive y direction. Here, the cable tie is, at the edge sides 23, 23' of the cable tie, restricted in terms of its movement in the z direction by the first guide slot 5 or the support surfaces 5a, 5b thereof. The second guide slot 6 may in this case likewise already restrict a movement of the cable tie 13 in the y direction, though this is not necessary because, in this example, as will be discussed further on the basis of FIG. 6, the support surfaces 6a, 6b are adapted not only to a dimension of the cable tie strip 17, as in the exemplary embodiment shown in FIGS. 1 to 3, but also to the cable tie 13 as a whole. The third guide slot 24 with the two support surfaces 24a, 24b initially remains without function as the cable tie 13 is led through in the pushing-through direction D shown.

If the cable tie 13 has now been pushed into the passage region 4, for example to such an extent that the front side 25 of the cable tie head 16 abuts against the bridge 9 or moves into the vicinity thereof, the cable tie 13, the inner side 22 of which is still oriented in the direction of the fastening foot 2, must be rotated about the z axis in order to realize the intended fully assembled state. This fully assembled state is illustrated in FIG. 6.

As an alternative to the illustrated pushing-through in a pushing-through direction D in the positive x direction, provision may also be made for pushing-through to be performed in the positive y direction. In this way, the subsequent need for the rotation of the rotation of the cable tie 13 is eliminated. Pushing-through in the positive x direction however has the advantage that, even under constricted conditions, for example if the passage region 4 is already attached very closely to a large component which extends in the x-z direction, for example to a panel, the cable tie 13 can also be easily retroactively assembled and disassembled, because the space requirement in the y direction is thus minimized.

In the present example, the support surfaces 5a, 5b are designed both for abutment against the edge sides 23, 23' of the cable tie strip 17 and for abutment against the edge sides 23, 23' of the cable tie head 16. Correspondingly, the spacing $d_1$ of the support surfaces 5a, 5b in a first region, which in the fully assembled state is relatively close to the material for binding 39, is smaller than the spacing $d_1'$ in a second section, which is further remote from the material for binding 39, of the support surfaces 5a, 5b. The support surfaces 5a, 5b are thus, in the region with the relatively small spacing $d_1$, designed for abutment against the cable tie strip 17 and, in the region with the relatively large spacing $d_1'$, designed for abutment against the cable tie head 16 or against the edge sides 23, 23' of the cable tie head 16. Here, the support surfaces 5a, 5b may also be adapted to a head geometry of the cable tie 13 in order to realize improved fixing.

Figure 6:
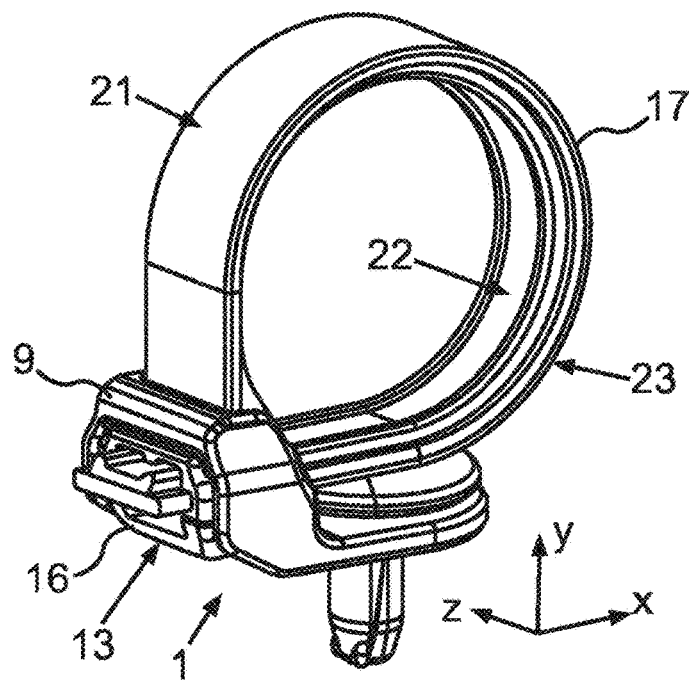
FIG. 6 shows the holding apparatus from FIG. 4 with an exemplary embodiment of a cable tie in a fully assembled state without material for binding.

FIG. 6 illustrates the described holding apparatus 1 in the fully assembled state and a cable tie 13 without material for binding 39. Here, the cable tie head 16 is situated in an end position and is regionally surrounded by the holding apparatus 1 in the manner of a cage. Here, the edge sides 23, 23' of the cable tie head 16 are in abutment against the support surfaces 5a, 5b of the first guide slot 5, one support surface 24a of the third guide slot 24 is in abutment against the inner side 22 of the cable tie head 16, and the further support surface 24b of the third guide slot 24 is in abutment against the outer surface 21 of the cable tie strip 17 in a region adjoining the cable tie head 16. One support surface 6a of the second guide slot 6 is in this case arranged in abutment with the outer side 21 of the cable tie strip 17 in a region which passes into the vicinity of the cable tie head 16 as a result of the cable tie strip 17 being inserted through the cable tie head 16. The further support surface 6b of the second guide slot 6 is in this case arranged in abutment with the front side 25 of the cable tie head 16. The outer side 21 of the cable tie strip 17 is in this case defined by the outer side in a state in which the cable tie 13 has not been fully assembled. The support surfaces 5a, 5b, 6a, 6b, 24a, 24b are, in the example shown, arranged with an accurate contour, preferably in positively locking fashion, against the associated sides or surfaces of the cable tie 13.

The fully assembled state that is shown is thus, in this example, achieved by virtue of the cable tie 13 firstly being pushed in the first direction, the pushing-through direction D, which may be the x direction or else the y direction, through the passage region 4 of the holding apparatus 1. If the pushing-through direction D does not correspond to the positioning of the cable tie head 16 in the end position, that is to say in the present case the pushing-through direction D is not the y direction, then the cable tie 13 is, at a later point in time, rotated about the z axis. As a result, the cable tie strip 17 then points in the positive y direction. A loop is then formed around the material for binding 39 (not illustrated here) by virtue of the cable tie strip 17 being inserted through the cable tie head 16 and engaged with detent action therein. During this insertion of the cable tie strip 17 through the cable tie head 16, the cable tie strip 17 is also pushed through the passage region 4 for a second time. The corresponding second pushing-through direction, which is defined by the second pushing-through action, is in this case different from the first pushing-through direction, and may in this case be opposite to the first pushing-through direction.

Altogether, the support surfaces 6a, 6b, 24a, 24b of the second and third guide slot 6, 24 thus abut against two diagonally opposite corners or angle regions that arise at the crossing region that is formed as a result of the cable tie strip 17 being inserted through the cable tie head 16, and the support surfaces thus fix the cable tie 13 in the y and x directions in an elegant manner. A displacement in the z direction is in this case prevented by the first guide slot. Altogether, the bridge 9 with the support surfaces 24b and 6b and the fastening head 3 with the foot regions 7a, 8a of the two arms 7, 8 thus act as a cage, in which the cable tie 13 is clamped as a result of closure of the loop.

FIG. 7 shows a perspective view of a further design variant of a holding apparatus 1, in this case with a cable tie 13 that has already been pushed in as far as an end position of the cable tie head 16 in the fully assembled state. As was already the case in the example described above, holding apparatus 1 in this case has support surfaces 5*a*, 5*b* of the first guide slot 5 which, in this case, are arranged so as to be oriented parallel and oppositely with respect to one another and which are designed for abutment against edge sides 23, 23' of the cable tie strip 17 and of the cable tie head 16. For this purpose, the support surfaces 5*a*, 5*b* are arranged with different spacings $d_1$, $d_1'$, because cable tie head 16 and cable tie strip 17 in this case have mutually different widths $b_{KB}$, $b_{KB}'$. It is thus also the case here that the spacing $d_1'$ in the region of the support surfaces 5*a*, 5*b*, which are designed for abutment against edge sides 23, 23' of the cable tie head 16, is greater than the spacing $d_1$ of the support surfaces 5*a*, 5*b* in the region in which the support surfaces 5*a*, 5*b* are designed for abutment against edge sides 23, 23' of the cable tie strip 17. In this case, too, the first guide slot 5 is oriented or arranged in the z direction.

In the present case, the support surfaces 6*a*, 6*b* of the second guide slot 6 are concealed by the holding apparatus 1 or the cable tie head 16. They are however in the present case each situated in the z-x plane, one support surface 6*a* being oriented in the positive y direction and the further support surface 6*b* being oriented in the negative y direction. Here, the further support surface 6*b* is, in the illustrated end position of the cable tie head 16, arranged in abutment against the front side 25 (FIG. 10) of the cable tie head 16. Thus, the further support surface 6*b* of the second guide slot 6 limits a movement of the cable tie 13 in the pushing-through direction D, in the present case the positive y direction.

In the present case, the third guide slot 24 is oriented in the x direction, wherein one support surface 24*a* is designed for abutment against the inner side 22 of the cable tie head 16, and the further support surface 24*b* is designed for abutment against an outer side 21 of the cable tie head 16. The third guide slot 24 thus prevents a translational displacement of the cable tie 13 or cable tie head 16 in the z direction.

Again, here, the guide slots 5, 6, 24 form a hole-like opening in the passage region 4, which opening is delimited by the support surfaces 5*a*, 5*b*, 6*a*, 6*b*, 24*a*, 24*b*.

In the present case, the support surface pairs 5*a*, 5*b*, 6*a*, 6*b*, 24*a*, 24*b* are substantially perpendicular to one another. Here, one support surface 5*a* of the first guide slot 5 transitions in the (in this case positive) x direction into one support surface 24*a* of the third guide slot 24, and in the example shown in the (in this case negative) z direction into the further support surface 24*b* or into that region 24*b*' of the support surface 24*b* which, in this case, is arranged directly opposite, that is to say without an offset, the former support surface 24*a* of the third guide slot 24. Analogously, the further support surface 5*b* of the first guide slot 5 transitions, in its region situated in the (in this case positive) x direction, into one support surface 24*a* of the third guide slot 24, and in the (in this case negative) z direction into that section 24*b*' of the further support surface 24*b* of the third guide slot 24 which is arranged directly opposite the former support surface 24*a*. The section 24*b*' of the further support surface 24*b* is in the present case arranged at an engaging-around portion 28 which engages around the cable tie head 16 in the (in this case negative) x direction and thus once again fixes the cable tie head in the x direction in the end position. The engaging-around portion 28 is in this case formed in the region 24*b*' of the further support surface 24*b* of the third guide slot 24 by the two arms 7, 8. The support surfaces 5*a*, 5*b*, 24*a*, 24*b* thus form, in the example shown, a duct which extends in the y direction and into which the cable tie 13 with cable tie strip 17 and cable tie head 16 is pushed. Here, the duct has an internal contour which is complementary with respect to the external contour of the cable tie head 16. Thus, the cable tie head 16 can be received in recessed fashion in the duct.

In the present case, the support surfaces 5*a*, 5*b* and 24*b* in each case both transition in the (in this case positive) y direction into the further support surface 6*b* of the second guide slot, such that the duct described immediately above is closed off in the y direction. Thus, the cable tie 13 can be inserted into the duct exclusively in the y direction, until the cable tie abuts, at the end of the duct, against the support surface 6*b* by way of the front side 25 of the cable tie head 16. The cable tie head 16 is then in the present case received in recessed fashion in the duct. Here, an additional detent element 27 may be attached to an inner side of the duct, for example to one support surface 24*a* of the third guide slot 24, by means of which additional detent element the cable tie head 16 can be engaged with detent action in the end position shown.

Here, the passage region 4 may, in a margin, in particular at a marginal region which is formed by the bridge 9, have a projection 29 or a lug which in particular forms a continuation of a projection of the type or a lug of the type which extends in the z direction on an inner side of the cable tie head 16 in the end position shown. This serves for the stabilization and improved guidance of the cable tie strip 17 by the passage region 4.

FIG. 8 shows a further perspective illustration of that which is shown in FIG. 7, from a different perspective. It is thus now the case that the inner side 22 of the cable tie 13 with the soft component 14 is shown. Furthermore, it is now also the case that the former support surface 6*a* of the second guide slot 6 is no longer concealed by the holding apparatus 1. Also, the support surfaces 5*a*, 5*b* have regions 5*a*' and 5*b*' which are spaced apart from one another with a spacing $d_1$ and which are provided for the guiding and for the holding of the cable tie strip 17 in the z direction. In the example shown, the support surfaces 5*a*, 5*b* are each of L-shaped.

FIG. 9 now shows the above-described holding apparatus 1 with a cable tie 13 in the fully assembled state without material for binding 39. FIG. 9 shows that the fully assembled state is again achieved by virtue of the cable tie 13 being pushed twice through the passage region 4 of the holding apparatus 1. The second pushing-through through the passage region 4 takes place in this case at the same time as the cable tie strip 17 is pushed through the cable tie head 16, which in the present case is concealed by the holding apparatus 1. By virtue of the fact that a region of the cable tie strip 17 which is arranged remote from the cable tie head 16 in the initial state resulting from a production process abuts against the support surface 6*a* during the second pushing-through action, and the cable tie strip 17 is then pushed through the cable tie head 16, the cable tie head 16 is prevented from slipping back in the negative y direction even without an additional detent element 27. A movement of the cable tie head 16 in the other directions is prevented by the above-described duct or by the cage-like structure of the passage region 4. Here, the internal contour adapted to the external contour of the cable tie head 16, and the spacing $d_1$, adapted to the width $b_{KB}$ of the cable tie strip 17, of the support surfaces 5*a*, 5*b*, contribute to a stable hold of the cable tie 13 in the holding apparatus 1.

Again, it is thus the case that, by means of the holding apparatus 1, in two diagonally oppositely situated corners or angle regions which are generated as a result of the cable tie 13 being led through itself in a crossing region, the cable tie 13 is clamped in the passage region 4 with the holding apparatus 1 during a fastening of the material for binding 39 on the inner side 22 of the cable tie 13. Here, the support surfaces 5a, 5b of the first guide slot 5 prevent the cable tie 13 from slipping in the z direction, the support surfaces 6a, 6b of the second guide slot prevent the movement of the cable tie 13 in the y direction, and the support surfaces 24a, 24b of the third guide slot 24 prevent a movement of the cable tie 13 in the x direction. By means of the ramp 18 which is formed in the present case by the soft component 14 in that region of the cable tie strip 17 which is situated close to the cable tie head, it is ensured here that a spacing $d_A$ of the material for binding 39 does not fall below a predefined minimum spacing to the holding apparatus 1.

FIGS. 10a-d show an exemplary embodiment of a cable tie 13 in various side and sectional views.

FIG. 10a thus shows a cable tie 13 with cable tie head 16 and cable tie strip 17, which extends with a longitudinal direction as main direction extent in the x direction. Transversely with respect to this, the cable tie strip 17 has a width $b_{KB}$ in the z direction. In addition to the toothing 29, which in this case is arranged for example on the outer side 21, it is also illustrated that the width $b_{KB}$ of the cable tie strip 17 is smaller than the width $b_{KB}'$ of the cable tie head 16. These widths $b_{KB}$, $b_{KB}'$ are advantageously adapted to the spacings $d_1$, $d_1'$ of the support surfaces 5a, 5b (FIGS. 1 to 9).

FIG. 10b illustrates a cross section in the section axis denoted by A-A in FIG. 10a. In the example shown, it is thus possible to see a cross section through the cable tie strip 17 of the cable tie 13 in a y-z plane. The soft component 14 is in this case arranged in the form of a strip on the inner side 22 of the cable tie 13 or cable tie strip 17. Here, the width $b_{WK}$ of the soft component 14 is smaller than the width $b_{KB}$ of the cable tie strip 17, which is defined by the hard component 20.

In the present case, two coupling elements 31 are illustrated on the inner side on the hard component 20, which coupling elements increase the adhesion of the soft component 14 to the hard component 20. The inner side 22 of the cable tie strip 17 is thus formed in a central region by the soft component 14 and in respective marginal regions 12, 12', which adjoin the edge sides 23, 23', by the hard component 20.

In the present case, the soft component 14 is provided with a first thickness $d_{WK}'$ in a central region and is provided with a different thickness $d_{WK}$ in respective regions facing toward the marginal regions 12, 12'. In the present case, the thickness $d_{WK}'$ is smaller than the thickness $d_{WK}$. Thus, a groove 32 is formed on the inner side by the soft component. In the example shown, the thickness $d_{WK}$ amounts to between 45% and 55% of the thickness $d_{KB}$ of the cable tie strip.

FIG. 10c illustrates the cable tie 13 in a width view. It is possible here to clearly see that the cable tie 13 comprises a soft component 14 and a hard component 20, wherein the soft component 14 is softer than the hard component 20. Here, the soft component 14 is attached in the form of a strip to an inner side 22 of the cable tie 13, more specifically of the cable tie strip 17, or regionally forms the inner side 22.

In a first end region 30, situated close to the cable tie head, of the cable tie strip 17, a ramp 18 is formed in this example by means of the increase of the thicknesses $d_{WK}$, $d_{WK}'$ of the soft component 14 toward the cable tie head 16. Toward the cable tie head 16, the ramp 18 has an abutment or detent surface 19 which, in the example shown, is oriented perpendicular or substantially perpendicular to the x direction and thus longitudinal direction of the cable tie 13. This is illustrated once again in more detail in FIG. 10e.

In a second end region 33 situated further remote from the cable tie head 16, the soft component has, in the present case, a ridge 34. The ridge 34 is formed here by virtue of the thickness $d_{WK}$ or $d_{WK}'$ initially increasing toward the end of the cable tie strip 17 before then returning to zero. This can also be seen once again in more detail in FIG. 11.

FIG. 10d now shows a plan view of an inner side of the cable tie 13. It is possible here to see that the soft component 14 extends along the cable tie strip 17 in strip form in the longitudinal direction of the cable tie 13, that is to say in the x direction. Here, in the present case, the soft component 14 forms, on the inner side, an abutment surface 15 for a material for binding 39. The width $b_{WK}$ is in this case visibly smaller than the width $b_{KB}'$ of the cable tie strip 17. As a result, the marginal regions 12, 12' are likewise illustrated. In the second end region 33, the groove 32 transitions in this case into the ridge 34.

FIG. 10e shows a cross section in the longitudinal direction in the x-y plane through the section axis indicated by B-B in FIG. 10d. Here, the thickness $d_{WK}$ of the soft component 14 increases in the region of the ramp 18 to the maximum thickness $d_{WKR}$. The maximum thickness $d_{WKR}$ may have a multiple of the thickness $d_{WK}$ of the soft component 14 in a region remote from the ramp, for example 2.5 times the magnitude.

Here, in the direction of the cable tie head 16, the ramp forms a detent surface 19. The detent surface is arranged with a spacing $d_R$ to an inner side 35 of the detent device in the cable tie head 16, against which inner side 35 the inner side 22 of the cable tie strip 17 abuts in a state in which the cable tie strip 17 is engaged with detent action with the cable tie head 16. The spacing $d_R$ is advantageously adapted for example to the width $b_B$ of the bridge 9 (FIG. 1) in order to realize secure engagement of the cable tie 13 with detent action in the holding apparatus 1.

Figure 11:
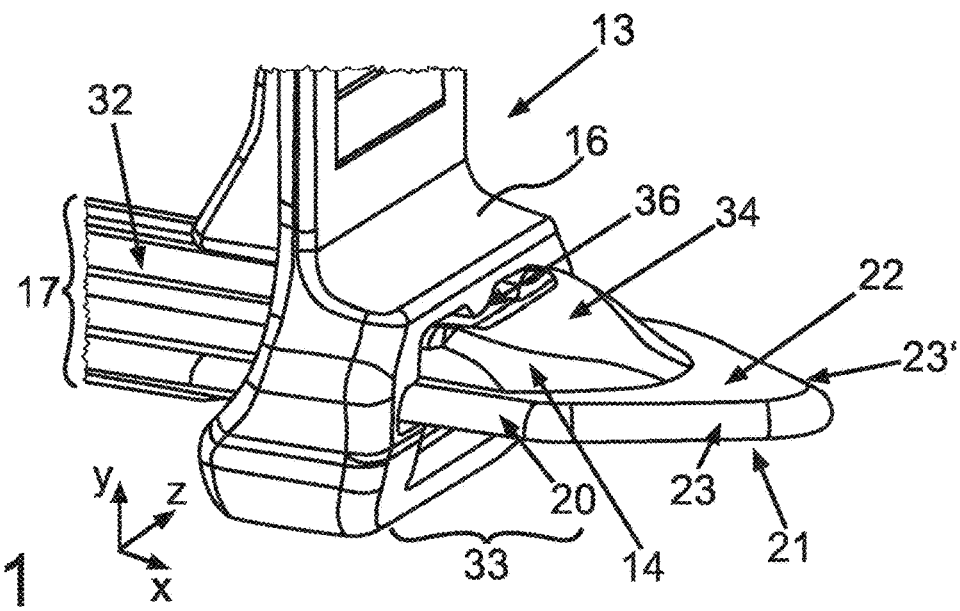
FIG. 11 shows a perspective view of an exemplary embodiment of a cable tie head with a cable tie strip.

FIG. 11 shows a perspective view of a cable tie 13 with a cable tie strip 17 partially pushed through the cable tie head 16 in a pre-installed state. Here, the cable tie head 16 has, in an opening for the cable tie strip 17 to be inserted through, a projection 36 which is a projection 36 oriented toward an inner side 22, inserted through the cable tie head 16, of the cable tie strip 17 and which engages into the groove 32 on the inner side of the soft component 14. In the present case, a ridge 34 is thus formed in the end region 33 of the cable tie strip 17 by the soft component 14. If the cable tie strip 17 is situated in the preassembled state shown, then it is made more difficult for the cable tie strip 17 to be pulled out of the cable tie head 16, because the projection 36 in the groove 32 can be pulled over the ridge 34 only by virtue of the soft component 14 being deformed in the region of the ridge 34. Thus, in this preassembled state, an undesired release of the provisional coupling of the cable tie strip 17 to the cable tie head 16 of its own accord is impeded or prevented.

The projection 36 may also be provided independently of the groove 32. The projection may protrude in the negative y direction to such an extent that it deforms the soft component 14 of the cable tie strip 17 pushed through the cable tie head 16 also behind the ridge 34 in the negative x direction. Thus, the deformation of the cable tie strip 17 in the presence of a tensile load is reduced owing to improved support of the cable tie strip 17, and thus the reliability of the cable tie 13 is increased.

Figure 12:
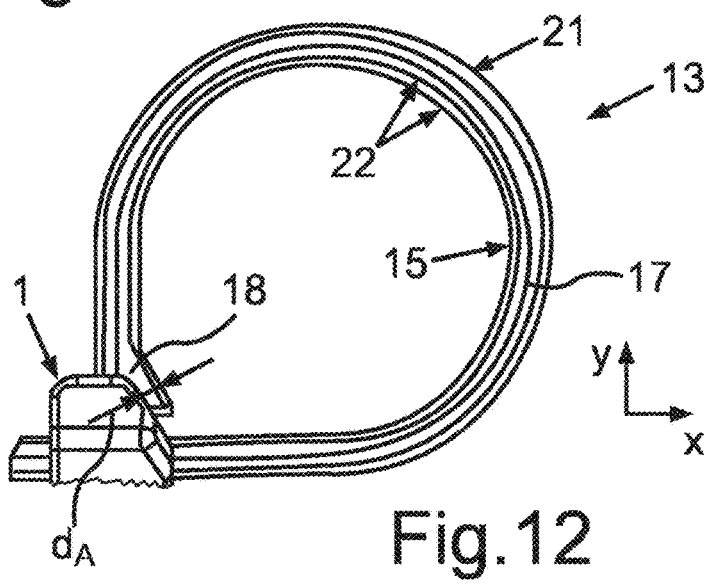
FIG. 12 shows a side view of an exemplary cable tie in a fully assembled state on an exemplary holding apparatus.

FIG. 12 now illustrates a side view of an exemplary embodiment of a holding apparatus 1 with an exemplary cable tie 13. It is clear here that, by means of the combination of a cable tie 13 with an elevated abutment surface 15 on the inner side 22, in the present case with a ramp 18, a material for binding (which is not illustrated here) can, in an elegant manner, be held in a contact-free manner with a predefinable spacing $d_A$ to the holding apparatus 1. On the inner side 22, the abutment surface 15 for the material for binding 39 and the ramp 18 are formed in the present case by the soft component 14.

Figure 13:
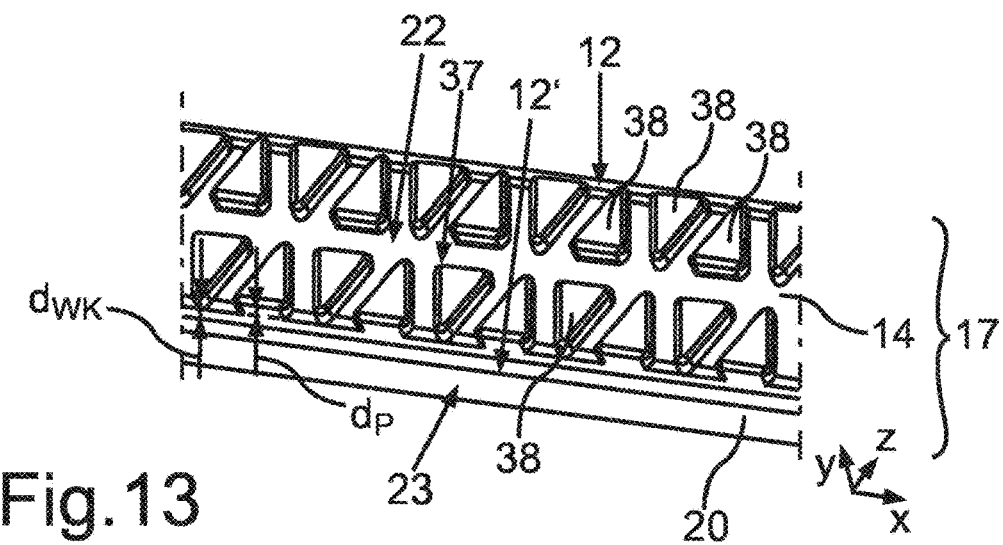
FIG. 13 shows a perspective detail view of an inner surface of an exemplary embodiment of a cable type strip with soft and hard components.

FIG. 13 shows a perspective illustration of an inner side 22 in a section of the cable tie strip 17. In the present case, the soft component 14 is arranged in the form of a strip on the inner side 22 of the cable tie strip 17. The inner side 22 is thus formed in a central region by the soft component 14 and in respective marginal regions 12 by the hard component 20. Here, too, the abutment surface 15 for the material for binding 39 is formed by the soft component 14.

In the example shown, the soft component 14 has a profile 37. The profile or the structure has a profile depth $d_P$ which amounts to for example 50 percent of the thickness $d_{WK}$ of the soft component 14. In the example shown, the profile 37 comprises two rows of elevated, uniform triangles 38, which, with their tips oriented in each case oppositely in alternating fashion, are oriented perpendicular to the longitudinal or x direction of the cable tie strip 17.

Figure 14:
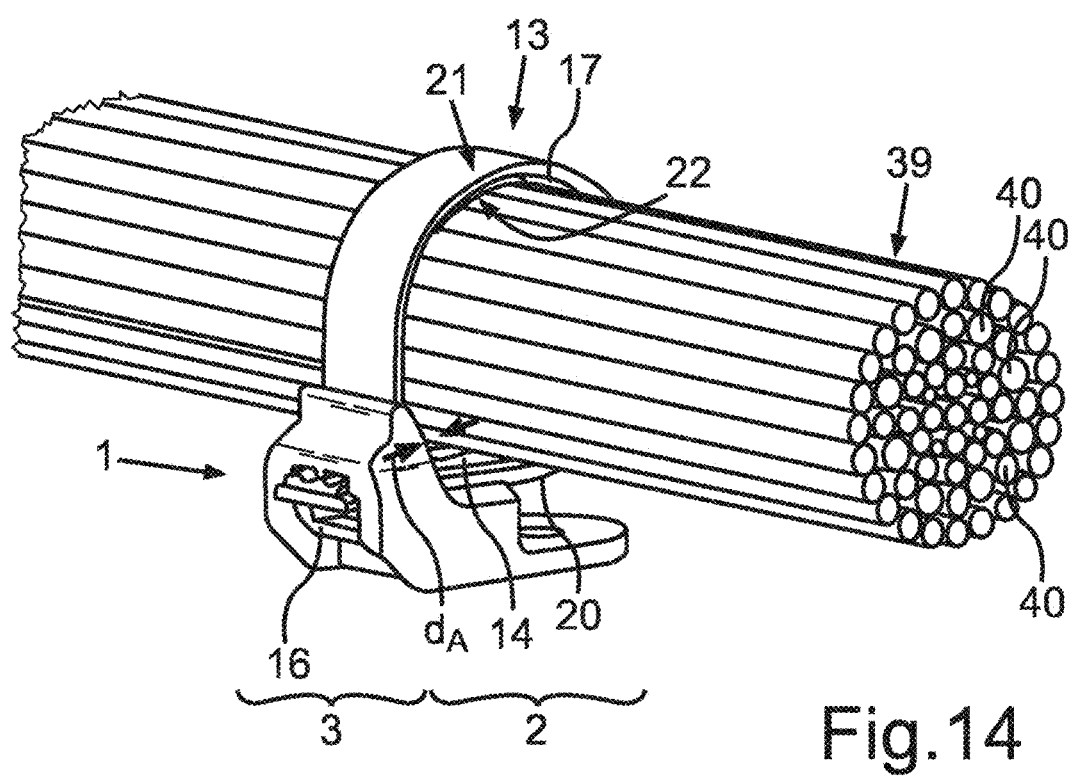
FIG. 14 shows a schematic view of a holding apparatus with an exemplary embodiment of a cable tie in a fully assembled state with material for binding.

FIG. 14 shows a perspective view of a holding apparatus 1 with a cable tie 13 and with a material for binding 39 in the fully assembled state. Here, the material for binding 39, which in the present case comprises a multiplicity of individual cables 40, though may equally also comprise only a single cable 40 or other articles, such as for example a pipe, is held by the cable tie 13 at the inner side on an inner side 22 of the cable tie 13, and the holding apparatus 1 is held with a predefined spacing $d_A$ to the holding apparatus 1. Here, in this exemplary embodiment, the cable tie head 16 is arranged in recessed fashion in the holding apparatus 1 or in the fastening head 3 of the holding apparatus 1, and is thus protected against further influences. Thus, in the example shown, the holding apparatus 1 makes contact predominantly or exclusively with the hard component 20 of the cable tie 13.

Figure 15:
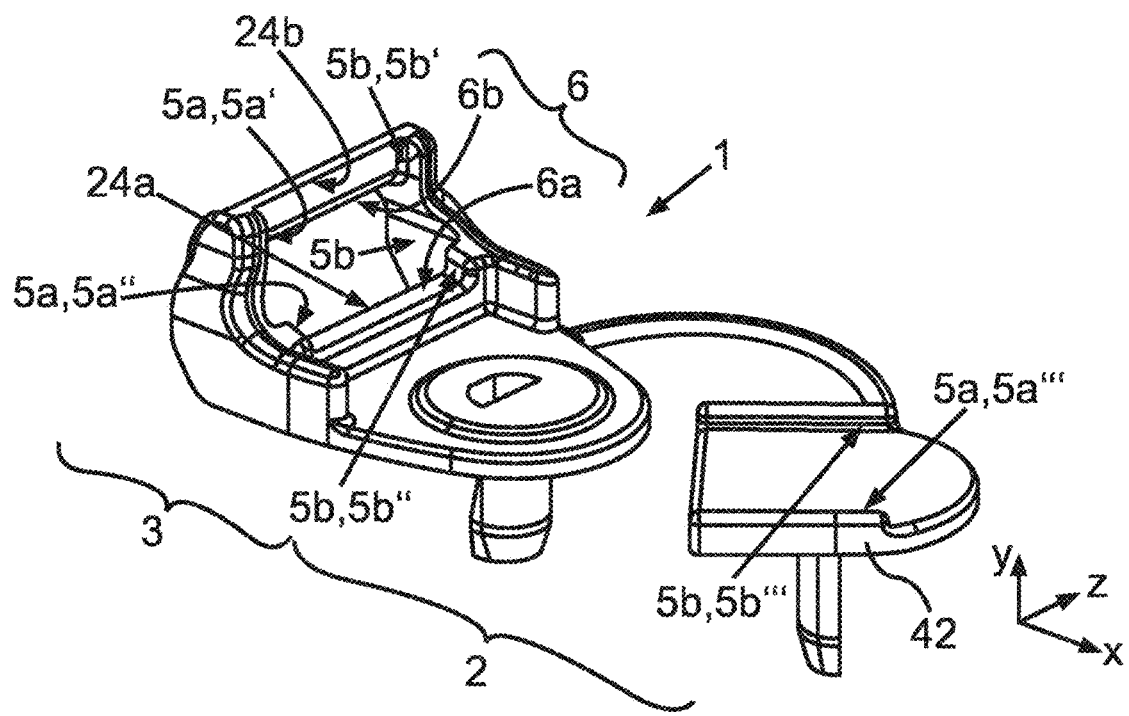
FIG. 15 shows a perspective view of an exemplary variation of the holding apparatus from FIG. 4.

FIG. 15 shows an exemplary variation of the holding apparatus from FIG. 4. In the example shown, the first guide slot 5 also has divided support surfaces 5a, 5b, which during intended use in each case support the edge sides 23, 23' of the cable tie strip 17 and/or of the cable tie head 16 at different, mutually spaced-apart regions (that is to say regions separated by a non-zero spacing). The divided support surfaces 5a, 5b thus have partial support surfaces 5a', se, 5a''', 5b', 5b'', 5b''' which at least regionally, that is to say regionally or entirely, run parallel to one another and are intended to support the cable tie 13 in the different regions.

In the present case, the partial support surfaces 5a', 5b', as side limbs of a U, adjoin the support surface 6a of the second guide slot 6, as the base limb of the U. Analogously, the partial support surfaces 5a'', 5b'', as a side limbs of a further U, adjoin the support surface 24b of the third guide slot 24, as the base limb of the further U. A further pair of partial support surfaces 5a''', 5b''' is in the present case arranged on the fastening foot 2, in the example shown on a movable clamping element 42 of the fastening foot 2.

Figure 16:
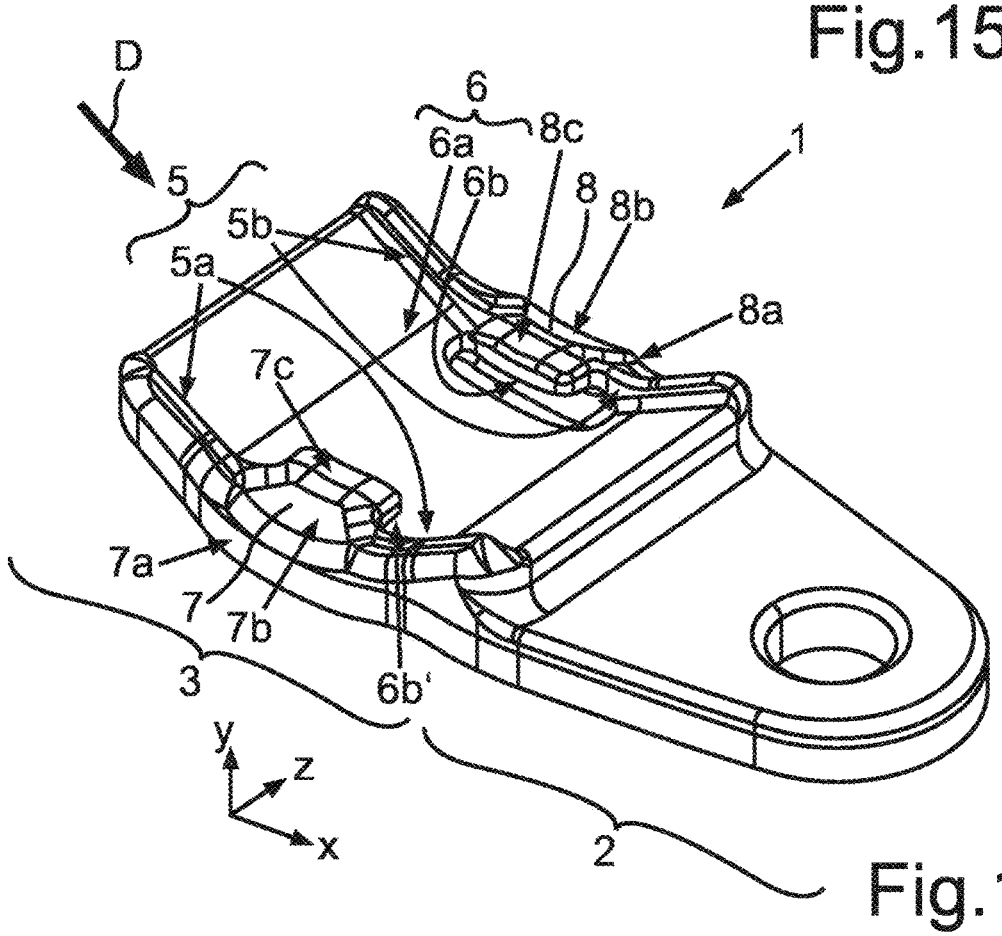
FIG. 16 shows a perspective view of a further exemplary embodiment of a holding apparatus.

FIG. 16 shows a further exemplary embodiment of a holding apparatus. Here, the first support surface 6a of the second guide slot 6 is arched in the pushing-through direction, that is to say in the x direction. The cable tie strip 13 is thus, during the intended pushing-through the positive or negative x direction, curved toward its inner side 22, such that, in regions, bending of the cable tie strip 13 about the material for binding 39 is pre-empted. The arching may have a predefined radius which lies in a plane with the normal vectors of the first support surface 6a, that is to say in this case in the x-y plane. Thus, the assembly of the cable tie 13 on the holding apparatus 1, and the subsequent fastening of the material for binding 39, are facilitated. In the present case, in a cross section perpendicular to the support surface 6a, the support surfaces 5a, 5b, as side limbs of a U, adjoin the support surface 6a of the second guide slot 6, as the base limb of the U. By means of the arched support surface 6a, along with the further support surfaces 5a, 5b, 6b, 6b', a depression-like receptacle for the cable tie 13 is realized in the present case.

In the example shown, the first support surface 6a is arranged offset with respect to the further, in this case oppositely oriented, support surfaces 6b, 6b'. For this purpose, apertures 43 are provided in respective space regions, situated opposite the further support surfaces 6b, 6b', of the first support surface 6a. The support surface 6a is thus, in the present case, within the scope of the deviation caused by the curvature, oriented in the positive y direction, and the support surfaces 6b, 6b' are oriented with the corresponding deviation in the negative y direction.

In the present case, the first support surface 6a has a greater extent in the pushing-through direction D than the further support surfaces 6b, 6b'. Owing to the symmetry, it is also possible in the present case for the cable tie to be pushed into the holding apparatus 1 counter to the pushing-through direction D that is indicated. The extent of the first support surface 6a in the pushing-through direction D is in this case more than three times as great as the extent of the further support surfaces 6b, 6b' in the pushing-through direction D. In the present case, the two further support surfaces 6b and 6b' respectively transition via the support surfaces 5b and 5a respectively into the support surface 6a. Altogether, therefore, a C-shaped arc is formed by two arcs which are U shaped in cross section in the z direction, with the support surface 5b and 5a as respective base limb, which both have the support surface 6a as side limb, the arc engaging around the cable tie 13 during intended use. Here, the central regions 7b, 8b and end regions, 7c', 8c of the two arms 7, 8 form, with the support surfaces 6b, 6b', the ends of the C. Here, the support surface 6a, as a rear wall of the C-shaped arc, perpendicular to the cross section, has an extent several times greater than that of the end regions 7c, 8c of the two arms 7, 8.

Figure 17:
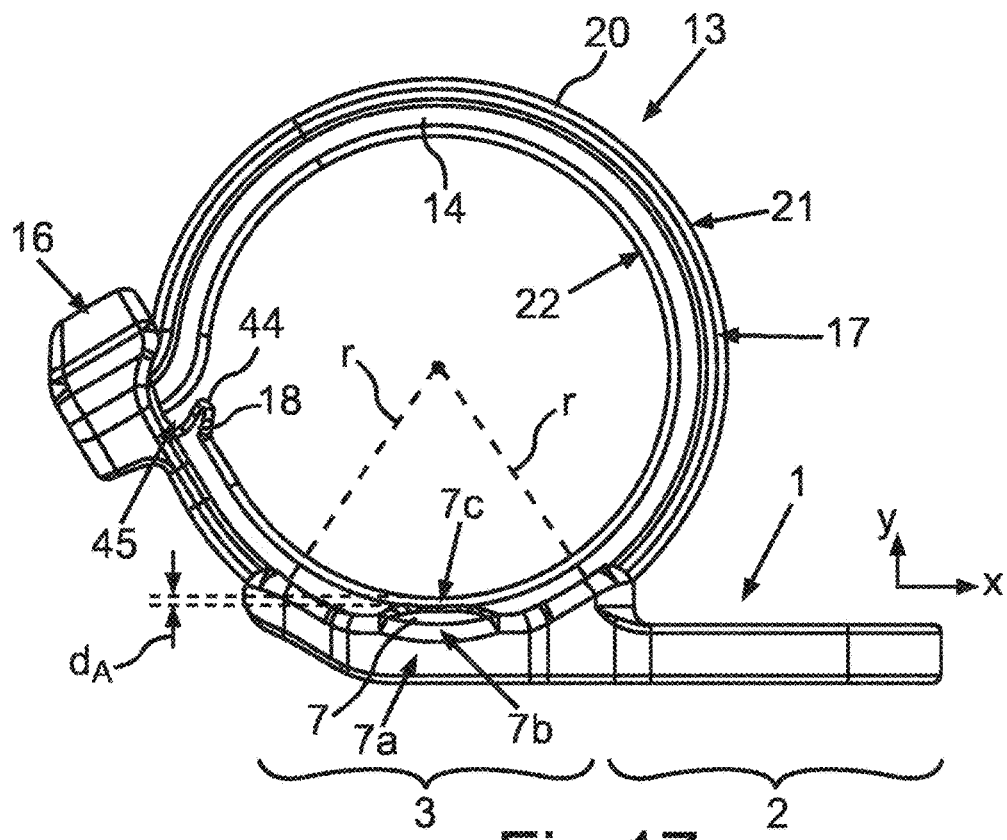
FIG. 17 shows a side view of the holding apparatus from FIG. 16 with an exemplary cable tie closed to form a loop.

FIG. 17 shows the holding apparatus of FIG. 16 with an exemplary cable tie closed to form a loop. Here, it is shown how the greater extent of the foot region 7a in the positive and negative x directions in relation to the end region 7c and central region 7b supports the cable tie 13 with the support surface 6a across a large region, and here, the predefined minimum spacing $d_A$ between holding apparatus 1 and material for binding (not illustrated) is adhered to. The radius r of the curvature of the support surface 6a, which in this case corresponds to the curvature of the loop of the cable tie 13, is also illustrated. Owing to the curvature, the foot region 7a in this case has a greater extent in the positive y direction than the end region 7c. That which has been described for the arm 7 also applies here mutatis mutandis to the arm 8, owing to symmetry.

The cable tie 13 has, in the present case, a ramp 18, formed from the soft component 14, in that end region 30 of the cable tie strip 17 which is situated close to the cable tie head. Here, the ramp 18 is adjoined by a lip 44, which reduces the size of a gap 45 between the soft component 14 in the end region 30 and in a region of the cable tie strip which has been pushed into the cable tie head 16.

Figure 18:
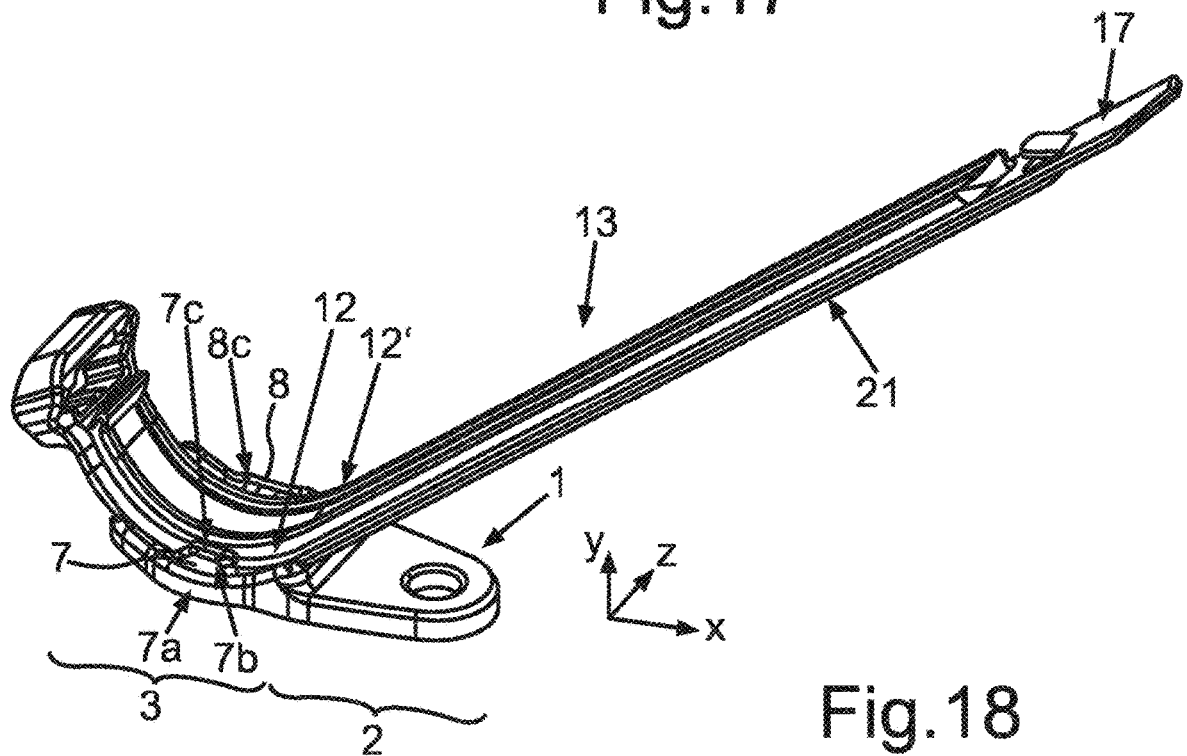
FIG. 18 shows a perspective view of the holding apparatus from FIG. 16 with an open exemplary cable tie pushed into the holding apparatus.

FIG. 18 shows the holding apparatus of FIG. 16 with an open exemplary cable tie that has been pushed into the holding apparatus. The perspective, which is rotated in relation to FIG. 17, shows that the arms 7, 8 engage with their end regions 7c, 8c around the marginal regions 12, 12' of the cable tie 13 in a relatively small region, and the support surface 6a supports the outer side 21 of the cable tie strip 17 in a relatively large region, that is to say bears against the outer side 21 in a relatively large region.

FIGS. 19a-d, correspondingly to FIGS. 10a-d, illustrate a further exemplary embodiment of a cable tie 13 in various side and sectional views.

FIG. 10a thus shows a cable tie 13 with cable tie head 16 and cable tie strip 17, which cable tie extends with a longitudinal direction as main direction of extent in the x direction.

By contrast to the cable tie 13 illustrated in FIG. 10a, in the present case an elevated spherical-segment-shaped sliding projection 46 is arranged centrally on that end region of the cable tie strip which is remote from the head. Furthermore, it is also the case here that, between the toothing 41 and the sliding projection 46, a detent spring element 47 is integrated in the cable tie strip 17, by means of which detent spring element the cable tie strip can be provisionally engaged with detent action in the cable tie head. Also, in the example shown, respective markings 48, 48' are applied in that end region of the cable tie strip 17 which is remote from the cable tie head and on the cable tie head 16. The markings 48, 48' are positioned such that, when the markings 48, 48' are aligned, a loop with a maximum radius is formed by the cable tie. The maximum radius is in this case the radius up to which the cable tie strip 17 can still be reliably engaged with detent action with the cable tie head 16.

Figure 19:
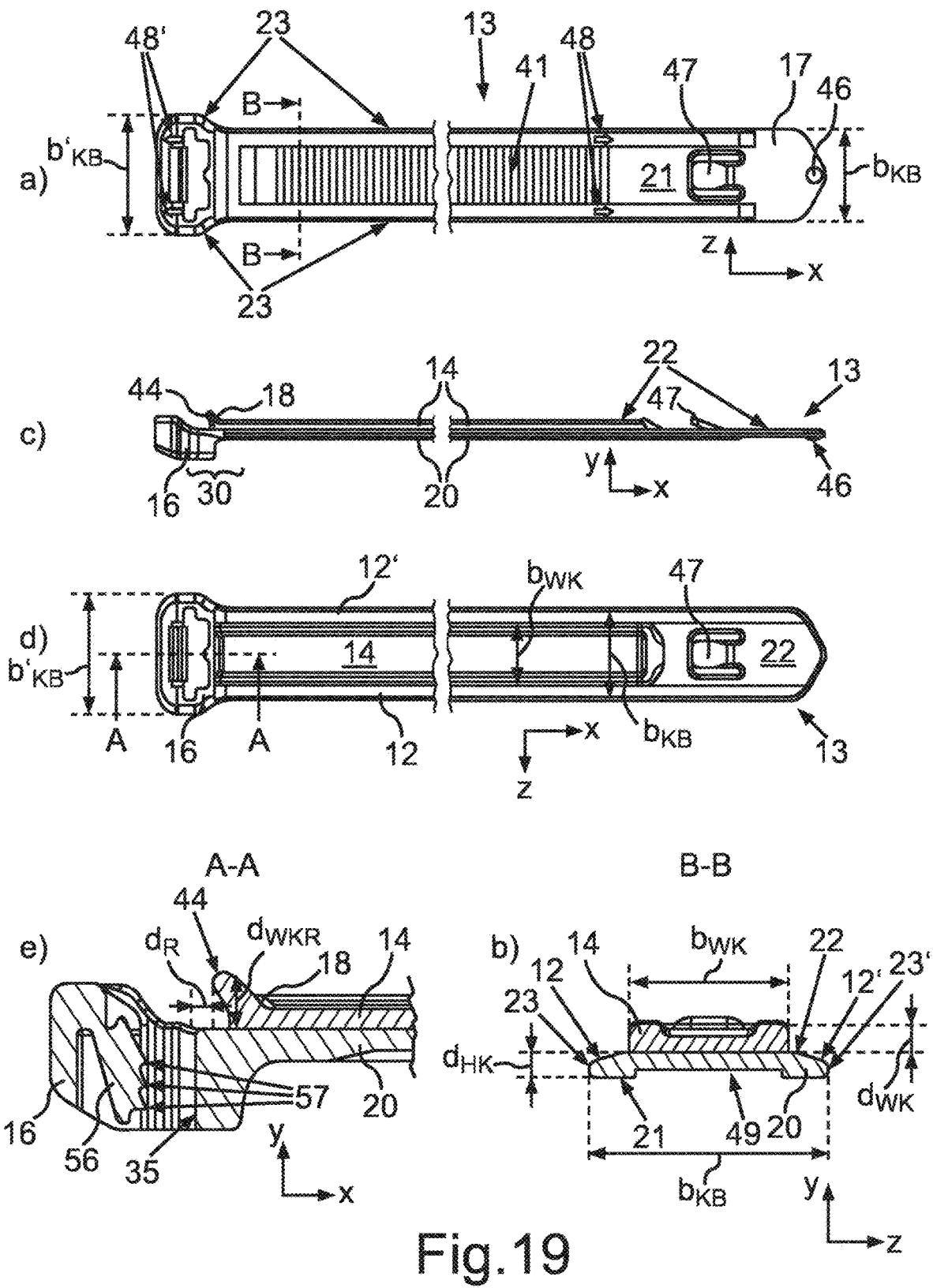
FIGS. 19a-e show various side and sectional views of a further exemplary embodiment of a cable tie.

FIG. 19b illustrates a cross section in the section axis denoted by B-B in FIG. 19a. In the example shown, therefore, it is possible to see a cross section through the cable tie strip 17 of the cable tie 13 in a y-z plane. The soft component 14 is in this case arranged in the form of a strip on the inner side 22 of the cable tie 13 or cable tie strip 17. In the present exemplary embodiment, the inner side 22 is inclined relative to the outer side 21, because the thickness $d_{HK}$ of the hard component decreases in the marginal regions 12, 12' towards the edge sides 23, 23'. This is illustrated in more detail in FIGS. 20a-b.

In this example, in the first end region 30, situated close to the cable tie head, of the cable tie strip 17, a ramp 18 is formed as a result of the increase of the thicknesses $d_{WK}$, $d_{WK}'$ of the soft component 14 toward the cable tie head 16. In the region of the ramp 18 on the inner side 22 of the cable tie strip 17, the soft component 14 has a lip 44. The lip 44 is spaced apart from the hard component 20 and extends from the ramp 18 away from the cable tie strip 17 in the direction of the cable tie head 16. The lip 44 can thus be understood in particular as a continuation of the ramp 18 in the direction of the cable tie head, which continuation, toward the cable tie head 16, moves away from the cable tie strip 17 in the positive y direction. This is illustrated once again in more detail in FIG. 19e.

FIG. 19d now shows a plan view of an inner side of the cable tie 13. It can be seen here that the soft component 14 extends along the cable tie strip 17 in the manner of a strip in the longitudinal direction of the cable tie 13, that is to say in the x direction.

FIG. 19e shows a cross section in the longitudinal direction in the x-y plane through the section axis denoted by A-A in FIG. 19d. Here, the thickness $d_{WK}$ of the soft component 14 increases in the region of the ramp 18 to the maximum thickness $d_{WKR}$. Here, in the direction of the cable tie head 16, the ramp 18 is continued by means of a lip 44 of the soft component 14. Thus, the spacing $d_R$ between soft component 14 and the inner side 35 of the detent device in the cable tie head 16 is reduced. The lip 44 may thus protrude in the direction of the cable tie head 16 beyond a region of the soft component 14 which is situated close or relatively close to the cable tie strip. The lip 44 may be combined with all of the described embodiments.

In the example shown, the cable tie head 16 also has a detent tongue 56 which engages with the toothing 41 as the cable tie strip 17 is pushed through the cable tie head 16. Here, it is then the case that a detent edge 57, in the present case multiple (in this case three) detent edges, engage(s) into the toothing. The detent edge(s) 57 may in this case in particular be arched in the z direction, that is to say along a contact surface with the cable tie strip 17.

Figure 20:
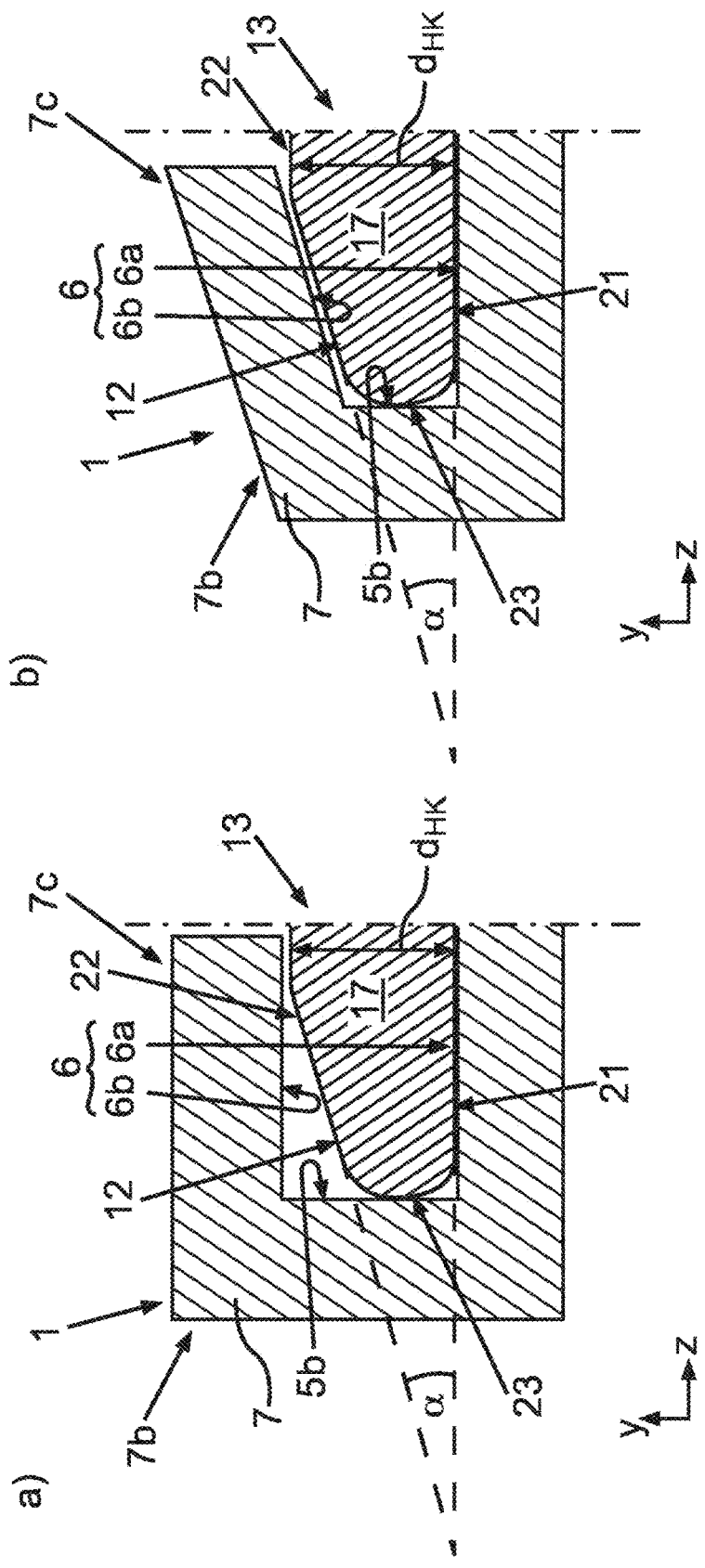
FIGS. 20a-b show a sectional view of an exemplary embodiment of a cable tie with an inner side inclined in the marginal regions and with respective exemplary holding apparatuses.

FIGS. 20a-b each show a detail of an exemplary embodiment of a cable tie with an inner side inclined in the marginal regions and with respective exemplary holding apparatuses in cross section in a width direction, that is to say in the y-z plane. In the marginal region 12 (and, correspondingly to FIG. 10b, also in the opposite marginal region 12' owing to symmetry), the inner side 22 is inclined relative to the outer side 21 of the cable tie strip 17 by an angle α. In the present case, the angle α amounts to 15 degrees, though may basically also deviate from the value by a tolerance of up to 15 degrees, and may thus amount to between 0 degrees and 30 degrees.

In FIGS. 20a and 20b, of the holding apparatus 1, in each case only the arm 7, with the corresponding support surfaces 5b, 6b and the support surface 6a, is shown. The second arm 8 which is not shown is of correspondingly symmetrical design. In FIG. 20a, the support surfaces 6a, 6b of the second guide slot 6 run parallel to one another and are adapted in terms of their spacing to the thickness $d_{HK}$ of the cable tie strip 17 in the marginal region 12. In FIG. 20b, the (substantially) oppositely oriented support surfaces 6a, 6b of the second guide slot 6 are inclined at the angle α with respect to one another, that is to say, in the marginal region 12, adapted to the profile of the thickness $d_{HK}$ of the cable tie strip 17. The same cable tie 13 can thus be utilized with both of the holding apparatuses 1 shown in FIGS. 20a-b. The holding apparatus 1 shown in FIG. 20b has in this case the advantage of the increased spacing to a material for binding (not illustrated), because the arm 7 protrudes to a lesser extent in the y direction in the central region 7b. Owing to the reduced angle between the support surfaces 5b and 6b, this variant also has a greater load-bearing capacity. The holding apparatus 1 may in particular have the further features of the holding apparatus 1 from FIG. 1 and/or FIG. 16.

Figure 21:
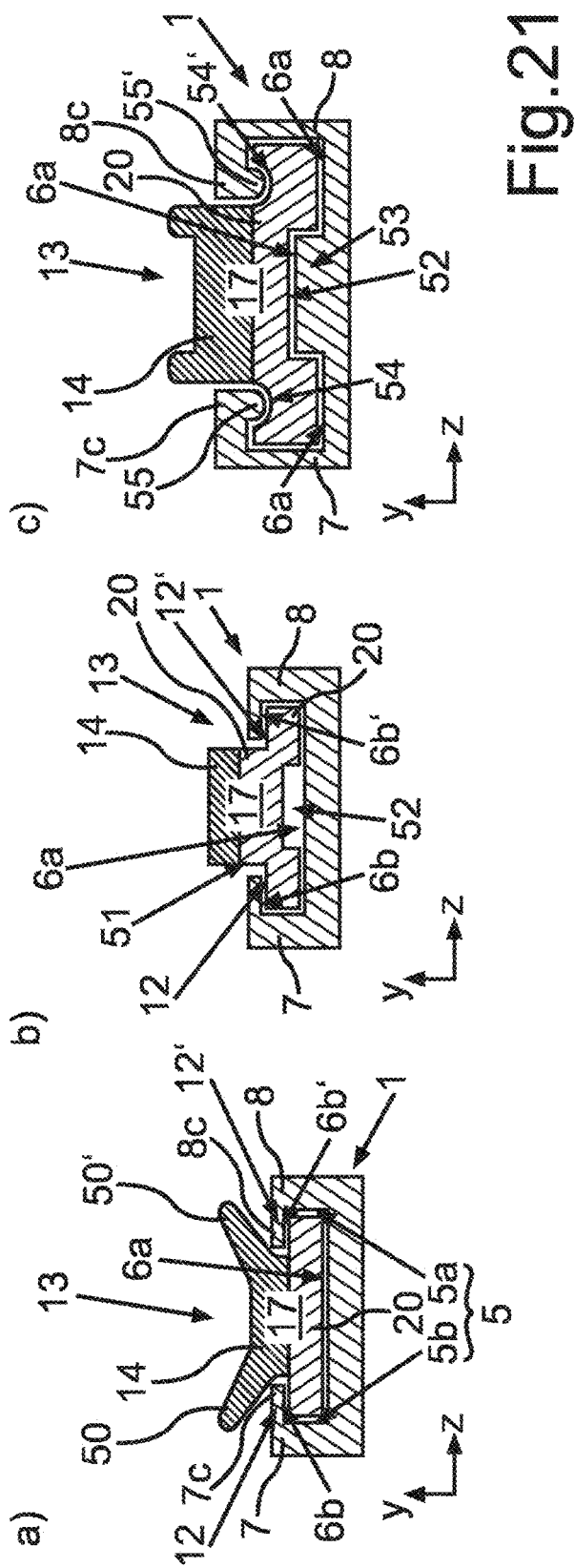
FIGS. 21a-c show further sectional views of exemplary embodiments of cable tie and holding apparatus.

FIGS. 21a-c illustrate further exemplary embodiments of cable tie and holding apparatus in a sectional illustration in the width direction. As in FIGS. 20a-b, the holding apparatus 1 is illustrated here in each case in simplified form only with the arms 7, 8 and the support surfaces 5a, 5b, 6a, 6b of the first and second guide slot 5, 6.

In FIG. 21a, the soft component 14 forms, additionally to the strip on the inner side, shown for example in FIG. 10c or 19c, in a respective limit region of the strip adjoining the marginal regions 12, 12' of the cable tie strip, in each case one wing 50, 50'. The wings 50, 50' are in this case symmetrical with respect to the center of the cable tie strip 17 and extend, like the strip, over a major part of the cable tie strip 17. In the illustrated cross section of the cable tie strip 17, the wings 50, 50', proceeding from the strip, extend with a non-zero spacing from the corresponding marginal region of the cable tie strip away from the cable tie strip 17 and away from the strip. During intended use, it is then the case that the end region 7c, 8c of the arms is arranged between the respective wing 50, 50', and the material for binding (not illustrated) is protected from the holding apparatus 1 by the wings 50, 50'.

In FIG. 21b, the hard component 20 has, between the marginal regions 12, 12', a central part 51 which is elevated in the vertical or z direction relative to the marginal regions 12, 12' and on which the soft component 14 is arranged. The marginal regions 12, 12' are thus recessed in relation to the inner side of the hard component 20 in the z direction and form a step. In the present case, the cable tie strip 17 also has, on the outer side, an aperture 52 which runs along the cable tie strip 17 and which can also be referred to as a groove.

The embodiment shown in FIG. 21c also has the aperture 52. Here, the support surface 6a of the second guide slot 6 has a corresponding projection 53, which engages into the aperture 52 as the cable tie strip 17 is pushed through the holding apparatus. Additionally, in the present case, the marginal regions 12, 12' of the cable tie strip each have a depression 54, 54' running along the cable tie strip. The depressions 54, 54' thus run on the inner side on the cable tie strip 17, and may be part of the support surfaces 6b, 6b', or else conversely, the support surfaces 6b, 6b' may be part of the depressions 54, 54'. Correspondingly, in the example shown, the cable tie strip 17 has, in the second guide surfaces 6b, 6b' of the second guide slot 6, corresponding lugs 55, 55' which engage into the depressions 54, 54'.

Figure 22:
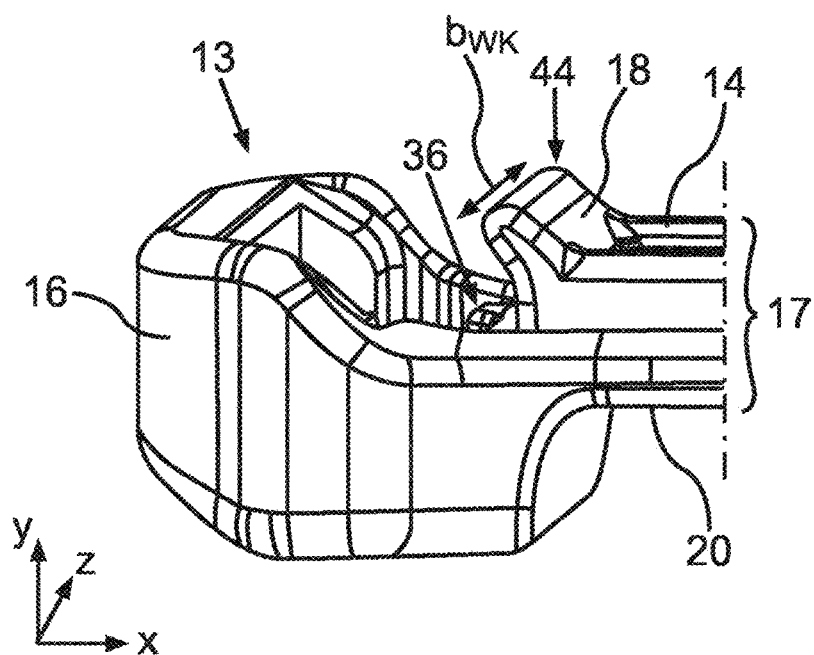
FIG. 22 shows a perspective view of a further embodiment of a cable tie.

FIG. 22 shows a further embodiment of the cable tie. In the present case, the lip 44 on the ramp 18 extends over the entire width $b_{WK}$ of the soft component 14. The soft component 14 thus extends as far as particularly close to the inserted cable tie strip 17, as shown in FIG. 23.

Figure 23:
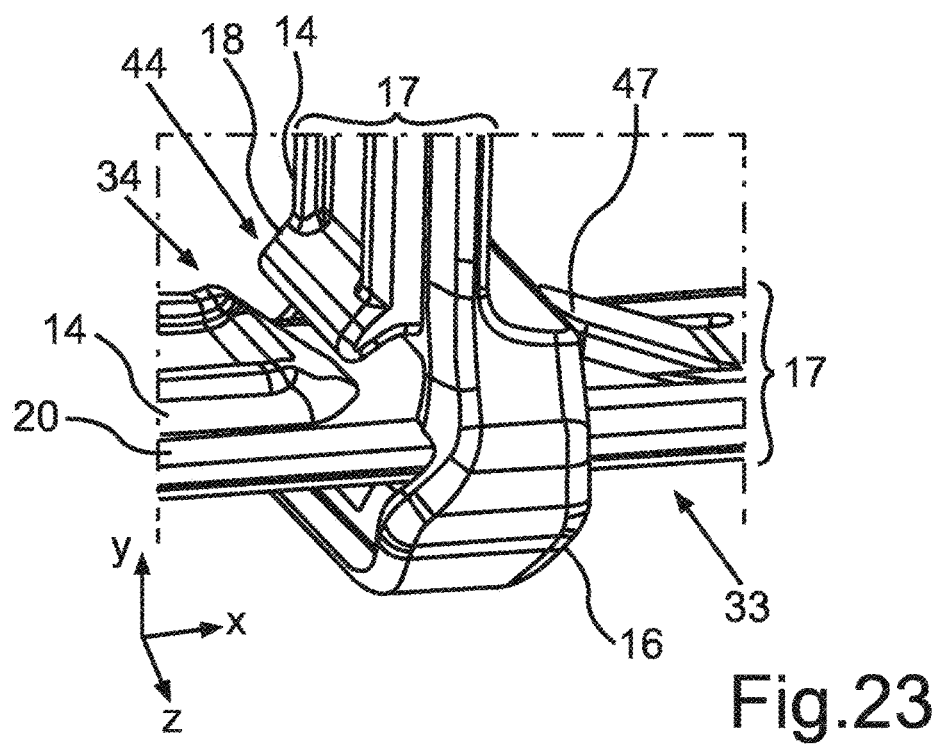
FIG. 23 shows a perspective view of the cable tie from FIG. 22 with cable tie strip inserted into the cable tie head.

FIG. 23 shows the cable tie of FIG. 22 with the cable tie strip inserted into the cable tie head. Here, the cable tie strip 17 is engaged with detent action with the detent spring element 47 arranged in the second end region 33, such that the cable tie strip 17 can no longer be inadvertently pulled out of the cable tie head 16. At the same time, the ridge 34 on the end piece, facing toward the end region 33, of the soft component 14, in the region of which ridge the thickness $d_{WK}$ of the soft component 14 is increased, serves in conjunction with the lip 44 to prevent the cable tie strip 17 from inadvertently slipping onward further through the cable tie head 16. This effect is promoted by virtue of the ridge 34 projecting out of the soft component 14 in the positive y direction, and the lip 44 projecting in the negative y direction from the ramp 18.

The invention claimed is:

1. A fastening system comprising:
a cable tie comprising:
  a toothed cable tie strip;
  a cable tie head with a detent device for detent engagement with the toothed cable tie strip; and
a holding apparatus separate from the cable tie, said holding apparatus comprising:
  a fastening foot for the fastening of the holding apparatus to a component; and
  a fastening head which is arranged on the fastening foot and which has a passage region configured to push the cable tie strip through the holding apparatus and configured to hold the cable tie on the holding apparatus,
wherein the passage region has two differently oriented guide slots, each with a pair of oppositely oriented support surfaces, the guide slots comprising a first guide slot and a second guide slot,
wherein the pairs of support surfaces are configured to guide associated surface regions of the cable tie head and the cable tie strip, such that at least one of the cable tie head and the cable tie strip is arranged at least partially between the respective pairs of support surfaces of the respective guide slot when the cable tie has been fully assembled with the component, wherein the pairs of support surfaces comprise a pair of first support surfaces and a pair of second support surfaces,
wherein the first guide slot with the pair of first support surfaces is configured to abut against surface regions at edge sides of the cable tie head,
wherein the fastening head has two arms in the passage region, which have a respective foot region facing the fastening foot, a respective end region facing the fastening foot, and a respective central region which is situated between the foot region and the end region and which has a respective internally situated support surface,
wherein the internally situated support surfaces are part of the first guide slot with the pair of first support surfaces,
wherein the internally situated support surfaces of the two arms are connected by a single bridge, and
wherein the cable tie in a final mounted state in a holding form of the cable tie is configured for holding the component positioned such that the component held by the cable tie is located contactless and distanced to the holding apparatus.

2. The fastening system in accordance with claim 1, wherein the guide slots open into one another, such that the cable tie strip and/or the cable tie head, as it is inserted into one guide slot can be guided in targeted fashion toward the other guide slot.

3. The fastening system in accordance with claim 1, wherein the guide slots are arranged in each case at an angle of between 75° and 105°.

4. The fastening system in accordance with claim 1, wherein the holding apparatus has a abutment surface, oriented substantially perpendicular to a pushing-through direction of the cable tie, for the abutment of a surface region against a front side, facing toward the cable tie strip, of the cable tie head.

5. The fastening system in accordance with claim 1, wherein the arms are connected in their end regions by the bridge, and a passage is formed in the passage region, wherein a height of the passage region is smaller than and/or equal to a maximum height of the cable tie strip.

6. The fastening system in accordance with claim 5, wherein a thickness of the bridge in a pushing-through direction of the cable tie corresponds to a spacing between a front side, facing toward the cable tie strip, of the cable tie head, or a guide surface in the cable tie head, and a detent projection of the cable tie strip on an inner side of the cable tie strip.

7. The fastening system in accordance with claim 1, wherein the second support surfaces of the second guide slot are oriented oppositely, with a deviation, relative to the pair of first support surfaces of the second guide slot.

8. The fastening system in accordance with claim 1, wherein the first support surfaces of the second guide slot are arched in a pushing-through direction of the cable tie.

9. The fastening system in accordance with claim 1, wherein the first support surfaces of the second guide slot have a greater extent in the foot region of the arms in a pushing-through direction of the cable tie than the second support surfaces of the second guide slot.

10. The fastening system in accordance with claim 1, wherein the passage region and the cable tie are adapted to one another in terms of their geometry for the abutment of the holding apparatus against the cable tie.

11. The fastening system in accordance with claim 1, further comprising:
wherein the cable tie strip has a hard component and has a soft component which is soft in relation to the hard component, and an outer side and the edge sides of the cable tie strip are at least regionally formed by the hard component, and the soft component extends in the form of a strip on an inner side in a longitudinal direction of the cable tie strip along the hard component over a major part of the cable tie strip,
wherein in a first end region, situated adjacent to the cable tie head, of the cable tie strip, a thickness of the soft component increases in ramped fashion toward an end of the cable tie strip.

12. The fastening system in accordance with claim 11, wherein the inner side of the cable tie strip is at least regionally formed by the hard component in marginal regions, adjoining the edge sides, of the cable tie strip.

13. The fastening system in accordance with claim 12, wherein the thickness of the cable tie strip decreases in the marginal regions toward the edge sides, or the soft component forms, additionally to the strip in a respective limit region of the strip adjoining the marginal regions of the cable tie strip, in each case one wing which, in a cross section in a width direction of the cable tie strip, proceeding from the strip of the soft component, extends spaced apart from the corresponding marginal region of the cable tie strip away from the cable tie strip and/or in the width direction away from the strip of the soft component.

14. A method for fastening a material for binding utilizing the fastening system of claim 1 to a further component, said method comprising the steps of:

fastening of the holding apparatus to the further component;
pushing the cable tie strip through the passage region of the holding apparatus; and
fastening of the material for binding to the cable tie and thus to the holding apparatus, further comprising forming of a cable tie loop around the material for binding, with inserting of the cable tie strip through the cable tie head,
wherein the material for binding is held on the holding apparatus by virtue of the cable tie being received with an accurate contour in the passage region of the holding apparatus by the differently oriented guide slots with in each case the pair of oppositely oriented support surfaces,
wherein, utilizing the first guide slot with the first pair of support surfaces, the cable tie is held in abutment against surface regions on edge sides of the cable tie strip, and the cable tie strip is arranged in each case at least partially between the respective pairs of support surfaces of the respective guide slot, and an inner side of the cable tie makes contact with the material for binding.

15. The fastening system according to claim 1,
wherein the support surfaces define a duct configured to receive the cable tie with the cable tie strip and cable tie head, the duct configured for receiving the cable tie head, and
wherein the holding apparatus further comprises:
at least one additional detent element attached to an inner side of the duct, the additional detent element configured to engage the cable tie head with detent action in an end position when the cable tie has been fully assembled with the component.

16. The fastening system according to claim 1, wherein the second guide slot has a first support surface in the foot region of the respective arm and has a further support surface in the end region of the respective arm, which support surfaces form a second pair of opposite support surfaces, resulting in a C-shaped overall slot in cross section perpendicular to a pushing-through direction through the two guide slots.

* * * * *